US009630365B2

(12) United States Patent
Frayne et al.

(10) Patent No.: US 9,630,365 B2
(45) Date of Patent: *Apr. 25, 2017

(54) METHOD FOR MANUFACTURING A PHYSICAL VOLUMETRIC REPRESENTATION OF A VIRTUAL THREE-DIMENSIONAL OBJECT

(71) Applicant: Looking Glass HK Ltd., Kwun Tong (HK)

(72) Inventors: Shawn Frayne, Tampa, FL (US); Shiu Pong Lee, Quarry Bay (HK); Tung Yiu Fok, Sha Tin (HK); Alexis Hornstein, Raleigh, NC (US)

(73) Assignee: Looking Glass Factory, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/287,884

(22) Filed: May 27, 2014

(65) Prior Publication Data

US 2016/0240003 A1   Aug. 18, 2016

Related U.S. Application Data

(60) Provisional application No. 61/827,124, filed on May 24, 2013, provisional application No. 61/878,789, filed on Sep. 17, 2013, provisional application No. 61/949,070, filed on Mar. 6, 2014.

(51) Int. Cl.
*G06T 19/00* (2011.01)
*B29C 67/00* (2017.01)
(Continued)

(52) U.S. Cl.
CPC ...... *B29C 67/0088* (2013.01); *B29C 67/0059* (2013.01); *B29C 67/0085* (2013.01);
(Continued)

(58) Field of Classification Search
None
See application file for complete search history.

(56) References Cited

U.S. PATENT DOCUMENTS 7,924,458 B2   4/2011   Taniuchi et al.
2003/0198757 A1*  10/2003   Wang ................. B44C 3/02
428/13

(Continued)

FOREIGN PATENT DOCUMENTS

| CN | 1600525 A | 3/2005 |
|---|---|---|
| CN | 102371835 A | 3/2012 |
| CN | 102470609 A | 5/2012 |

*Primary Examiner* — Kenneth M Lo
*Assistant Examiner* — Michael W Choi
(74) *Attorney, Agent, or Firm* — Jeffrey Schox; Thomas Gwinn

(57) ABSTRACT

One variation of a method for manufacturing a physical volumetric representation of a virtual three-dimensional object includes: slicing the virtual three-dimensional object into a set of virtual layers of discrete virtual thickness; for each virtual layer in the set of virtual layers, selecting a set of cross-sections of a portion of the virtual three-dimensional object within the virtual layer, setting an opacity level for each cross-section, combining the set of cross-sections into a composite cross-section based on an opacity level set for each cross-section, and printing the composite cross-section onto a dominant face of a substrate in a set of substrates; and assembling the set of substrates into a stack, each substrate in the set of substrates positioned within the stack according to a position within the virtual three-dimensional object of a cross-section printed on the substrate.

19 Claims, 9 Drawing Sheets

(51) Int. Cl.
  *G06T 11/00* (2006.01)
  *B33Y 10/00* (2015.01)
  *B33Y 40/00* (2015.01)
  *B29L 9/00* (2006.01)

(52) U.S. Cl.
  CPC ............ *G06T 11/00* (2013.01); *G06T 19/006* (2013.01); *B29K 2995/0026* (2013.01); *B29L 2009/005* (2013.01); *B33Y 10/00* (2014.12); *B33Y 40/00* (2014.12); *G06T 2219/2004* (2013.01); *G06T 2219/008* (2013.01)

(56) References Cited

U.S. PATENT DOCUMENTS

| | | | |
|---|---|---|---|
| 2006/0114505 A1* | 6/2006 | Fitzpatrick | G06T 11/60 358/1.15 |
| 2007/0081733 A1* | 4/2007 | Matsuhira | H04N 1/40068 382/245 |
| 2007/0146734 A1* | 6/2007 | Taniuchi | B29C 67/0059 358/1.1 |
| 2010/0121475 A1 | 5/2010 | Lyons | |
| 2011/0222081 A1* | 9/2011 | Yi | G06T 17/00 358/1.9 |
| 2012/0034346 A1* | 2/2012 | Morgan | A23P 20/20 426/72 |
| 2012/0255663 A1* | 10/2012 | Holroyd | B29C 67/0074 156/64 |
| 2013/0138234 A1* | 5/2013 | Dufort | G06T 19/00 700/98 |

\* cited by examiner

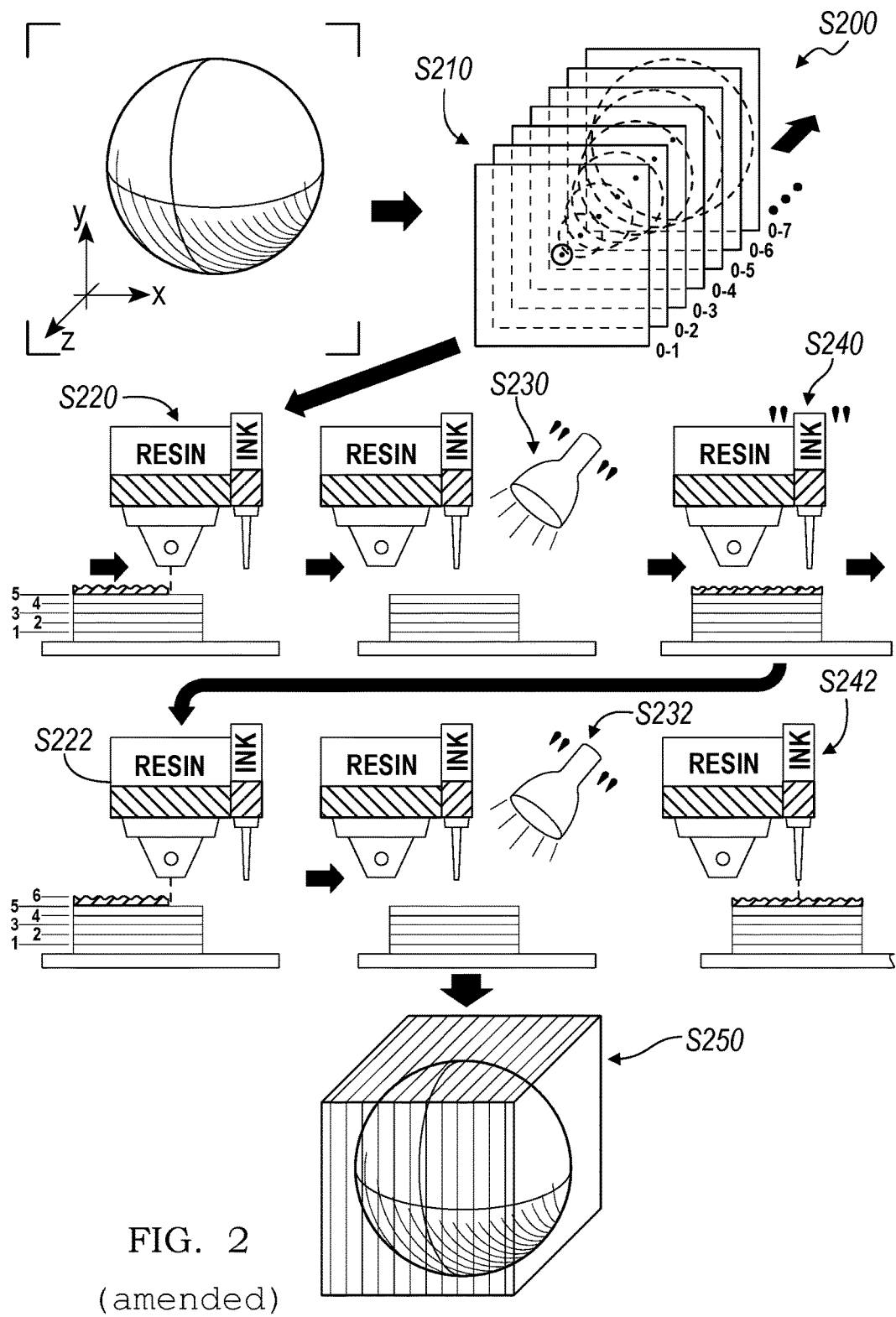
FIG. 2
(amended)

S100,
S200,
S300

S100,
S200,
S300

S110,
S210,
S320

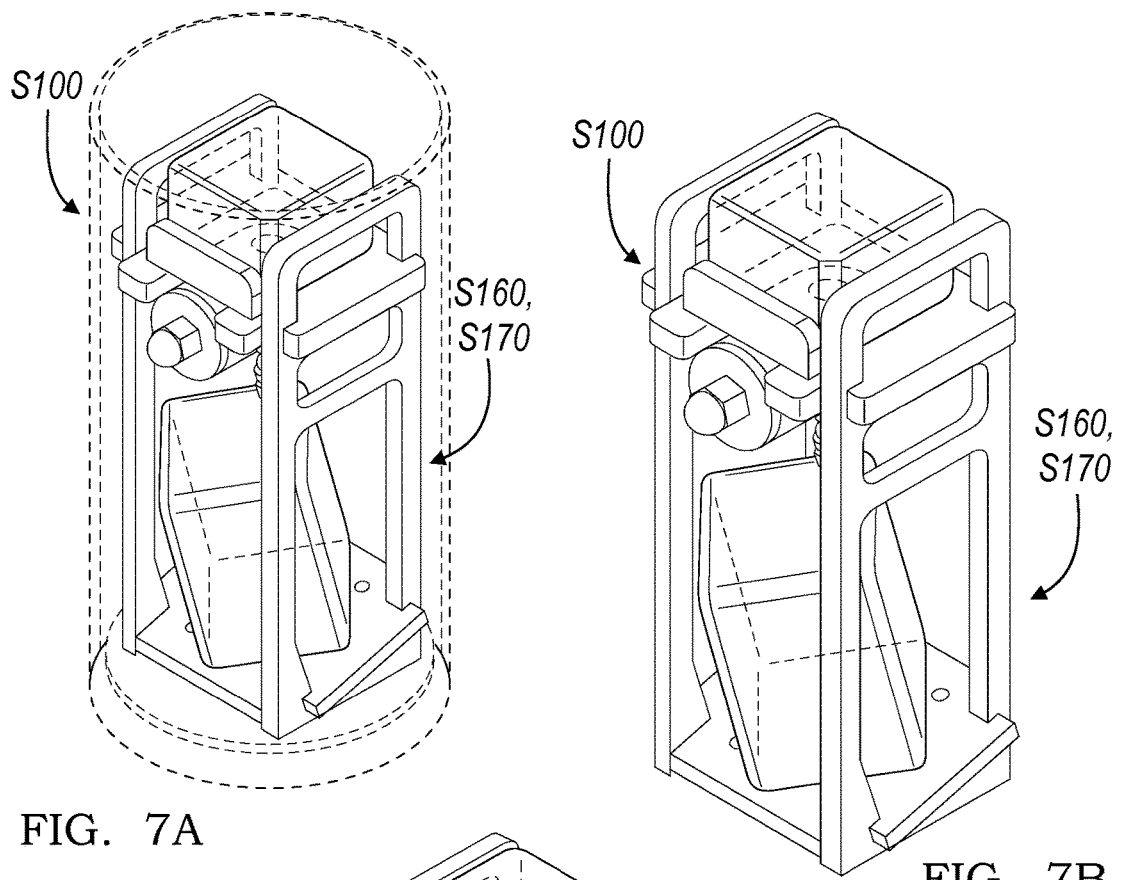
FIG. 7A
FIG. 7B
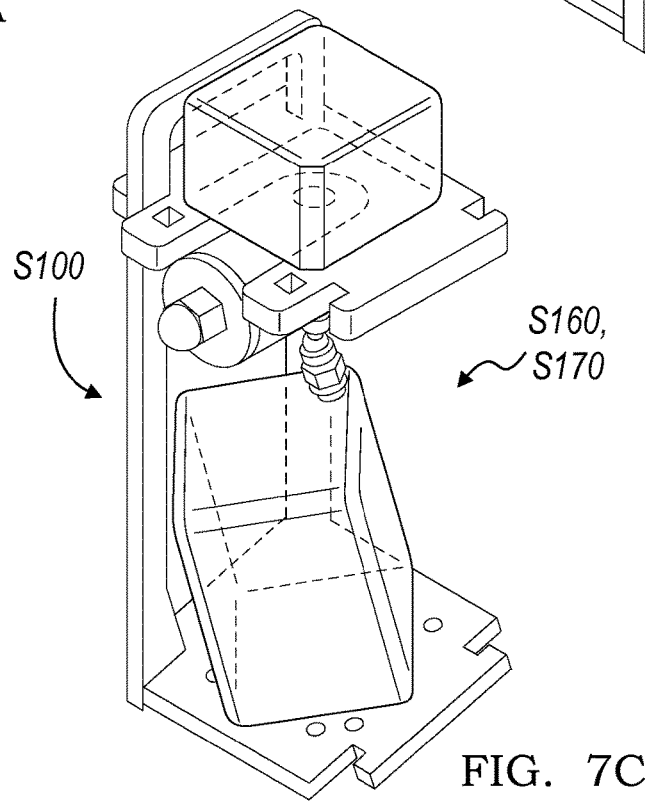
FIG. 7C

METHOD FOR MANUFACTURING A PHYSICAL VOLUMETRIC REPRESENTATION OF A VIRTUAL THREE-DIMENSIONAL OBJECT

CROSS-REFERENCE TO RELATED APPLICATIONS

This applications claims priority to U.S. Provisional Application No. 61/827,124 filed on 24 May 2013, U.S. Provisional Application No. 61/878,789 filed on 17 Sep. 2013, and to U.S. Provisional Application No. 61/949,070 filed on 6 Mar. 2014, all of which are incorporated in their entireties by this reference.

TECHNICAL FIELD

This invention relates generally to the field of three-dimensional imaging, and more specifically to a new and useful method for manufacturing a physical volumetric representation of a virtual three-dimensional object in the field of three-dimensional imaging.

BRIEF DESCRIPTION OF THE FIGURES

FIG. 2 is a flowchart representation of a second method of the invention;

FIGS. 7A, 7B, and 7C are schematic representations of one variation of the first method;

DESCRIPTION OF THE PREFERRED EMBODIMENTS

The following description of the preferred embodiment of the invention is not intended to limit the invention to these preferred embodiments, but rather to enable any person skilled in the art to make and use this invention.

1. First Method: Discrete Layers and Applications

Figure 1:
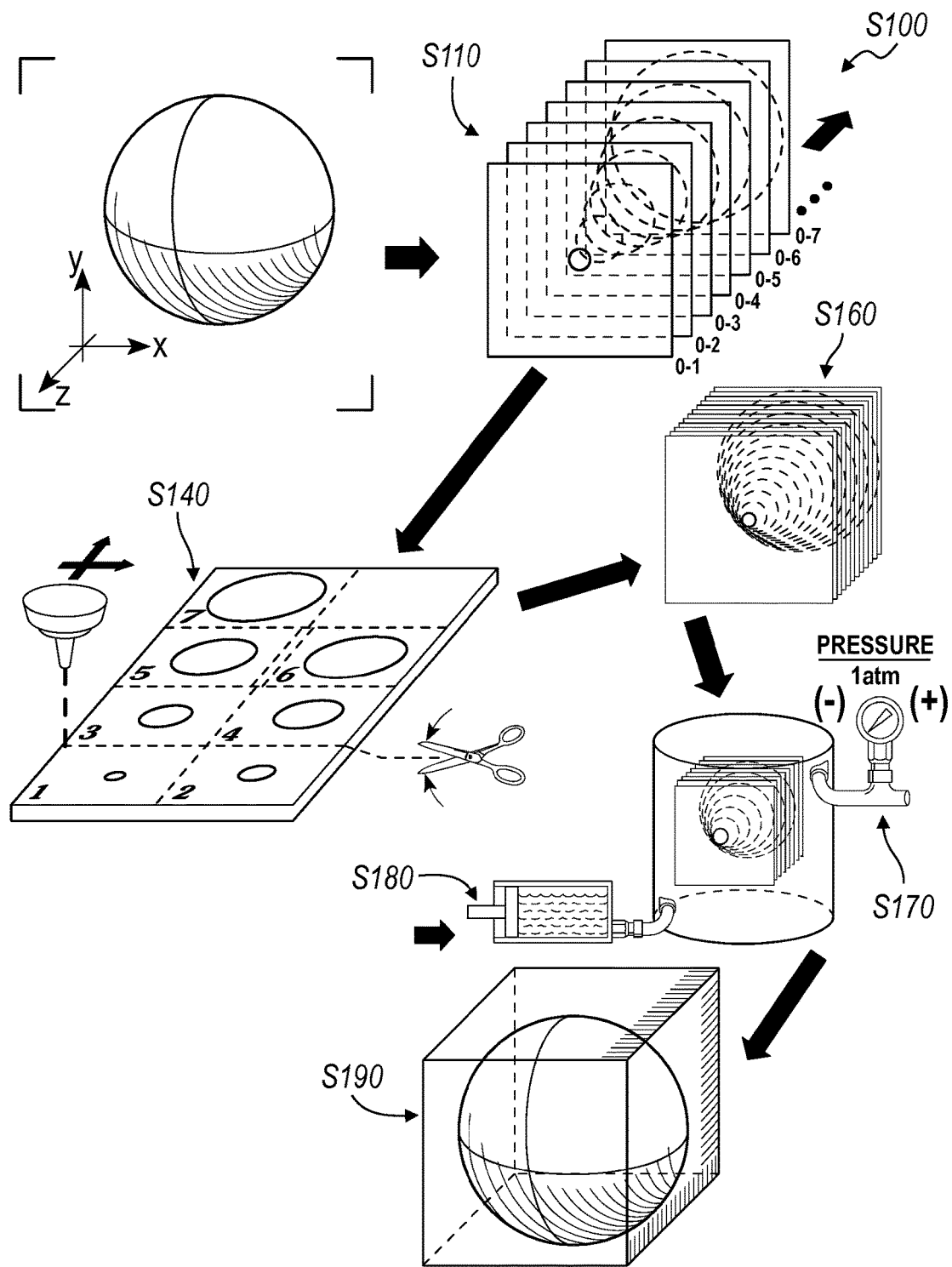
FIG. 1 is a flowchart representation of a first method of the invention.

As shown in FIG. 1, a method S100 for manufacturing a physical volumetric representation of a virtual three-dimensional object includes: receiving a series of adjacent cross-sections of the virtual three-dimensional object in Block S110; for each cross-section in the series of cross-sections, printing the cross-section over a transparent portion of a dominant face of one substrate in a set of substrates in Block S140; assembling the set of substrates into a stack, each substrate in the set of substrates positioned within the stack according to a position within the virtual three-dimensional object of a cross-section printed on the substrate in Block S160; drawing a vacuum around the stack in Block S170; in the presence of the vacuum, introducing a transparent fluid to interstices between substrates in the stack, an index of refraction of the transparent fluid approximating an index of refraction of a substrate in the set of substrates in Block S180; and releasing the vacuum around the stack in Block S190.

Figure 5A:
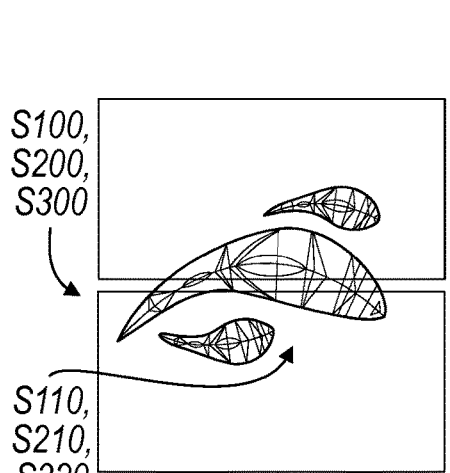
FIGS. 5A, 5B, 5C, and 5D are graphical representations of one variation of the methods.
Figure 5B:
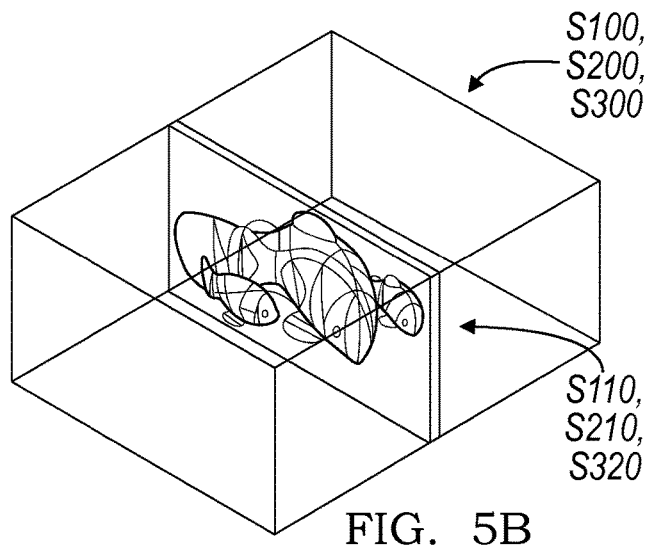
Figure 5C:
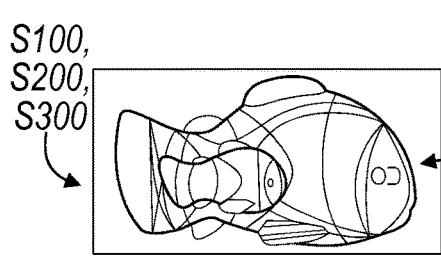
Figure 5D:
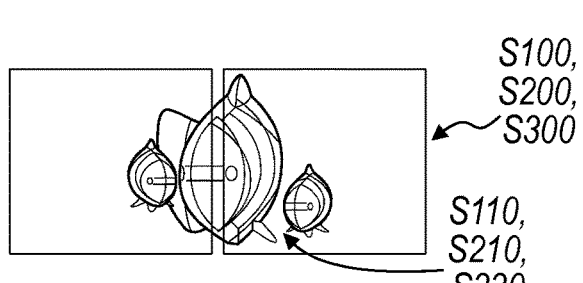

Generally, the method S100 can be implemented in manufacture of a three-dimensional volumetric "print" exhibiting a three-dimensional graphic representation of an object or multiple objects, such as a scene, in physical space, as shown in FIGS. 5A and 5D. In particular, the method S100 can be executed to slice a virtual three-dimensional model into cross-sections, to print—in ink—images of the cross-sections onto transparent substrates e.g., sheets), to stack the transparent substrates with images printed thereon in alignment, as shown in FIGS. 5B and 5C, and to fill interstices between adjacent substrates in the stack with a transparent fluid exhibiting an (average) index of refraction (or Abbe number and/or other optical property) approximating that of the substrates, thereby reducing internal reflection of light through stack of substrates. The series of cross-sectional images printed on sequential substrates in the stack can thus visually approximate the form of the virtual object(s) in real (i.e., physical) space, and this substantially intransient three-dimensional representation can be viewed from outside of the stack by multiple viewers simultaneously and with the naked eye.

The method S100 can thus be implemented to replace volumes between substrates within the stack and gas (e.g., air) pockets trapped within the stack with an "index-matching" fluid, thereby increasing optical uniformity throughout the volume of stack outside of the physically-represented virtual object and increasing visibility through the stack to the physically represent virtual object. The method S100 can also control opacity levels for cross-section images printed on a series of substrates such that a three-dimensional representation of a virtual object exhibits some translucency, thereby enabling a view to see through real "object" represented within the stack and/or enabling the object to be illuminated within the stack via a light source outside the stack. In particular, by controlling opacity (or translucency) of printed cross-section images, the method S100 can generate a physical three-dimensional representation of a virtual object that preserves color of the virtual object throughout the entire depth of the virtual object and that enables a viewer to visually access this color information throughout the depth of the physical representation of the virtual object.

In one example, the method S100 can be executed to print an archival three-dimensional "image" of an object (e.g., a frog skeleton) or a scene (e.g., race track with three-dimensional representations of cars in position on the track at a particular instance during a race). In another example, the method S100 is executed to generate a stack containing a three-dimensional representation of a medical procedure, such as a translucent three-dimensional representation of a patient's brain—with a cancer mass shown in a distinct color—based on virtual object of the patient's brain generated from a CAT scan. In yet another example, the method S100 is executed to generate multiple stacks, each containing a three-dimensional representation of an architectural structure, throughout a design phase of a project. In these examples, the method S100 can selectively move cross-sections of the object(s) or scene to be represented between being in-focus and being out of focus to control definition (or perceived importance) of objects or regions of objects represented within the stack.

Such a stack generated through application of the method S100 can also be backlit to control visibility of "object" represented in ink in three dimensions within. For example, the stack can be illuminated with a lighting system built into or arranged in proximity to the stack, such as one or more OLED layers arranged across one external surface of the stack. In this implementation, Block S140 can print—onto substrates in the stack—portions of images of cross-sections of a virtual object in fluorescent ink such that additional visual content may be accessed by a user by exposed the stack with a fluorescent light source. However, the method S100 can be used in any other application to generate a physical three-dimensional representation of a virtual object.

From herein after, "virtual model" will refer to any virtual object, set of virtual objects, or scene, and "physical model" will refer to any assembly of substrates and (printed) ink layers defining a physical volumetric representation of a virtual model.

1.1 Cross-Sections

Block S110 of the method S100 recites receiving a series of adjacent cross-sections of the virtual three-dimensional object. Generally, Block S110 functions to collect and/or generate a series of cross-sections corresponding to a virtual model to be represented in physical space by printing images of the cross sections on a set of substrates in Block S140, stacking the set of substrates in Block S160, and finishing the stack in Block S190. For example, Block S110 can execute with Block S140 on a printing machine to upload images of cross-sections subsequently printed onto substrates in Block S140. Alternatively, Block S110 can be implemented within a computer-aided drafting (CAD) software executing on a laptop of desktop computer extract cross-sections from a three-dimensional CAD model of an object or scene constructed virtually within the CAD software. Yet alternatively, Block S110 can be implemented within a standalone three-dimensional printing application executing on a computing device (e.g., a laptop or desktop computer, a smartphone, a tablet etc.) to import a digital file of a virtual object, to extract cross-sections from the virtual object, and to upload images of the cross-sections to a (external) printing machine.

As described above, the virtual model can include one or more virtual objects with or without virtual internal features. For example, the virtual model can include a computer-generated three-dimensional virtual object, such as a solid three-dimensional CAD model of a chair including modeled internal cushion materials and fasteners. In this example, the virtual model can also include a solid three-dimensional CAD model of a human sitting in the chair and exhibiting with color-real skin, facial features, and clothing but without representation of internal organs. Furthermore, in this example, the virtual model can include a virtual cigarette in the virtual humans hand and a virtual wisp of smoke rising from the virtual cigarette. Block S110 can thus receive or populate (e.g., generate from the virtual model) a sequence of cross-sections representing internal and external features of the chair, external features and colors of the human and the cigarette, and "specks" representation the virtual wisp of smoke and with specific opacity levels set for each corresponding region of each cross-section. Subsequent Blocks of the method S100 can thus yield a real model (i.e., a volumetric print) of the "scene" in physical space, wherein internal structures of the chair is visible, the human is represented in substantially true color, and the cigarette smoke is evident in the real scene. However, Block S110 can receive or generate cross-sections of any other type of object, objects, or scenes.

Figure 4A:
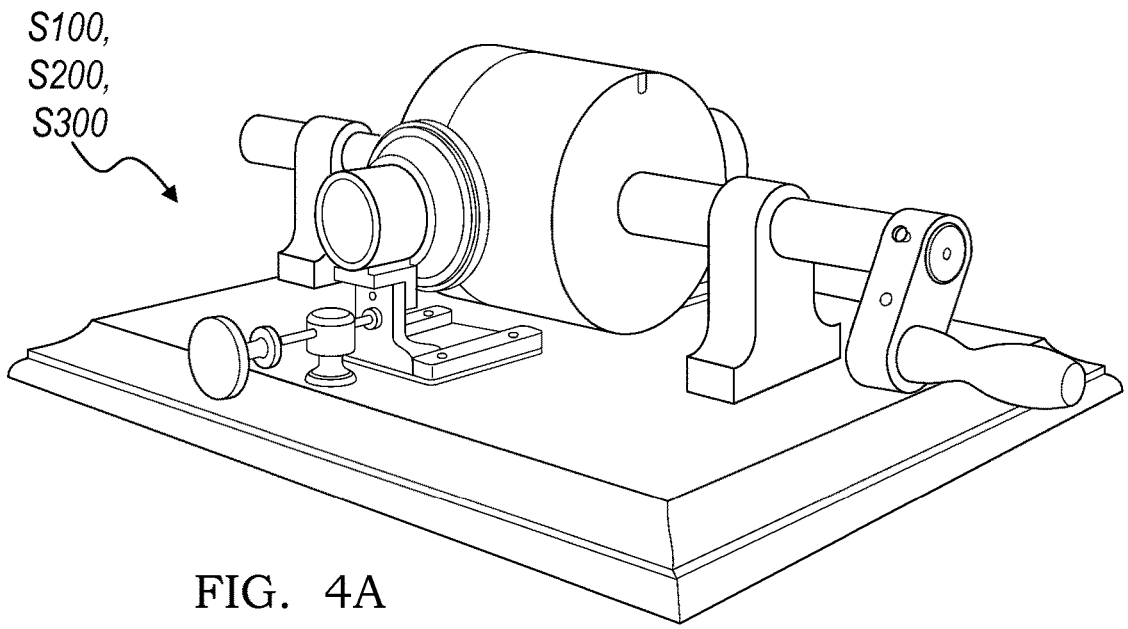
FIGS. 4A, 4B, and 4C are graphical representations of variations of the methods.
Figure 4B:
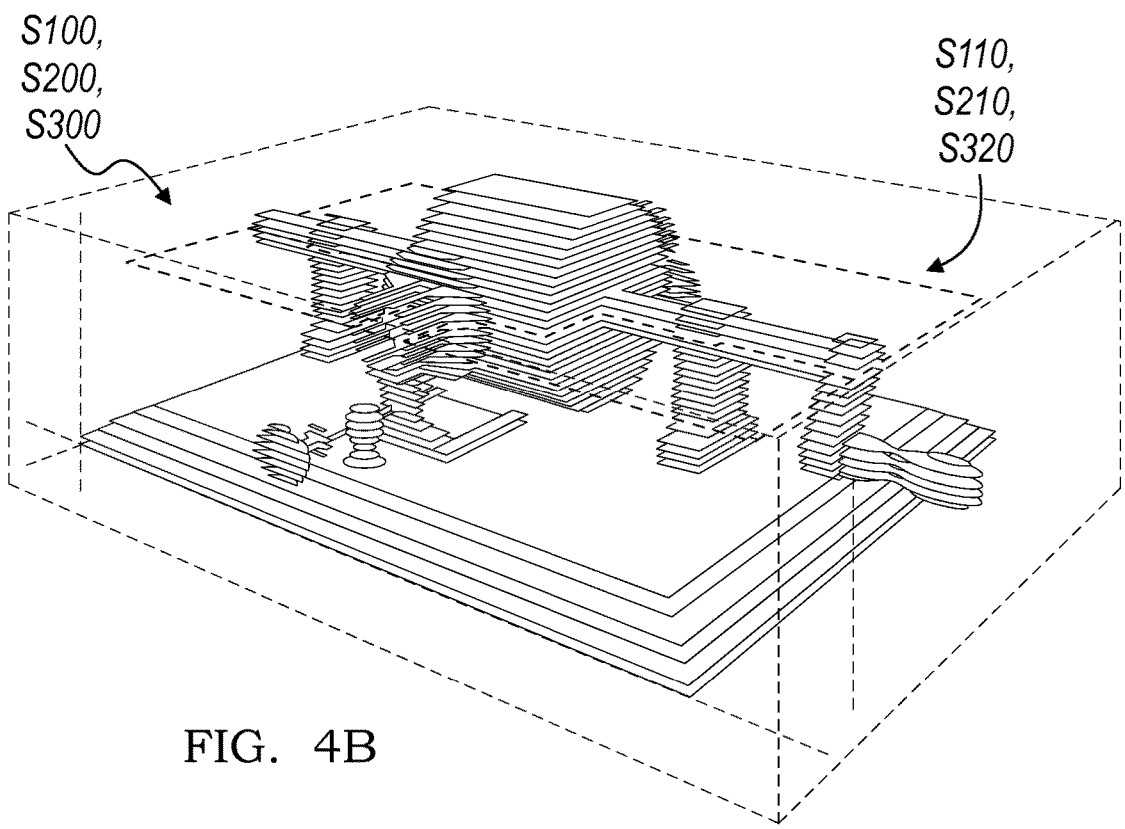

In one implementation, the method S100 generates a rectilinear (e.g., cubic) stack of transparent substrates with non-linear cross-sections of an organic (i.e., non-linear) virtual model printed onto a subset of the substrates within the stack, thereby yielding an impression a the representation of the virtual model "floats" within the stack. In this implementation, the stack can be composed of a set of substrates defining rectilinear sheets of transparent material of substantially uniform thickness across a substrate and throughout the set of substrates, and the stack can exhibit a substantially uniform center-to-center distance between adjacent substrates throughout the stack. To create a stack as in this implementation, Block S110 can receive a digital model of a virtual model (e.g., a virtual sphere), as shown in FIG. 4A, specify a series of parallel (i.e., nonintersecting) virtual planes intersecting the virtual model and offset by a virtual distance corresponding to the real center-to-center distance between adjacent substrates that such a stack would exhibit, as shown in FIG. 4B, and then capture a cross-section of the virtual model at the intersection of each virtual plane with the virtual model. In this implementation, Block S110 can capture cross-sections that are color-true to the virtual model, that include both external lines (of some thickness) coinciding with a shell of the virtual model, and that include points, lines, and/or areas representing virtual internal features of the virtual model. Block S110 can thus select a series of discrete cross-sections of the virtual model coinciding with parallel and offset virtual planes passing through the virtual model.

In the foregoing implementation, Block S110 can also receive any one or more parameters controlling a selection of cross-sections from the virtual model, such as target center-to-center distance between (real) substrates in the physical volumetric representation, substrate thickness, real model resolution, real model scale, etc. For example, Block S110 can receive from a user a selection for a real model type in which adjacent substrate layers are bonded together with a think adhesive film, a selection for a substrate sheet material thickness of 0.5 mm, and a maximum width dimension of 80 mm for a physical representation of a virtual object, such as through a user interface shown in FIG. 6. In this example, Block S110 can also set or receive an object boundary offset value (i.e., a minimum distance between the physical representation of the virtual model with the stack to an outer surface of the stack, or a minimum distance between an edge of a substrate and an border of an image printed on the substrate) at 10 mm. Thus, Block S110 can calculate a number of slices through the virtual model according to the function:

$$n=[\text{real width}]/[\text{center-to-center distance}]=80 \text{ mm}/0.5 \text{ mm}=160.$$

Block S110 can thus define 160 parallel and evenly-spaced virtual planes through the virtual object and capture a cross-section of the virtual model at the intersection of each planes through the virtual model. In this example, Block S110 can specify 160 discrete substrates onto which one image of each of the 160 cross-sections will be printed, twenty blank substrates of the same footprint that are to be assembled over an 'inked' substrate on one side of the stack, and another twenty blank substrates of the same footprint that are to be assembled over a printed substrate on one side of the stack (in order to achieve the object boundary offset requirement).

Figure 4C:
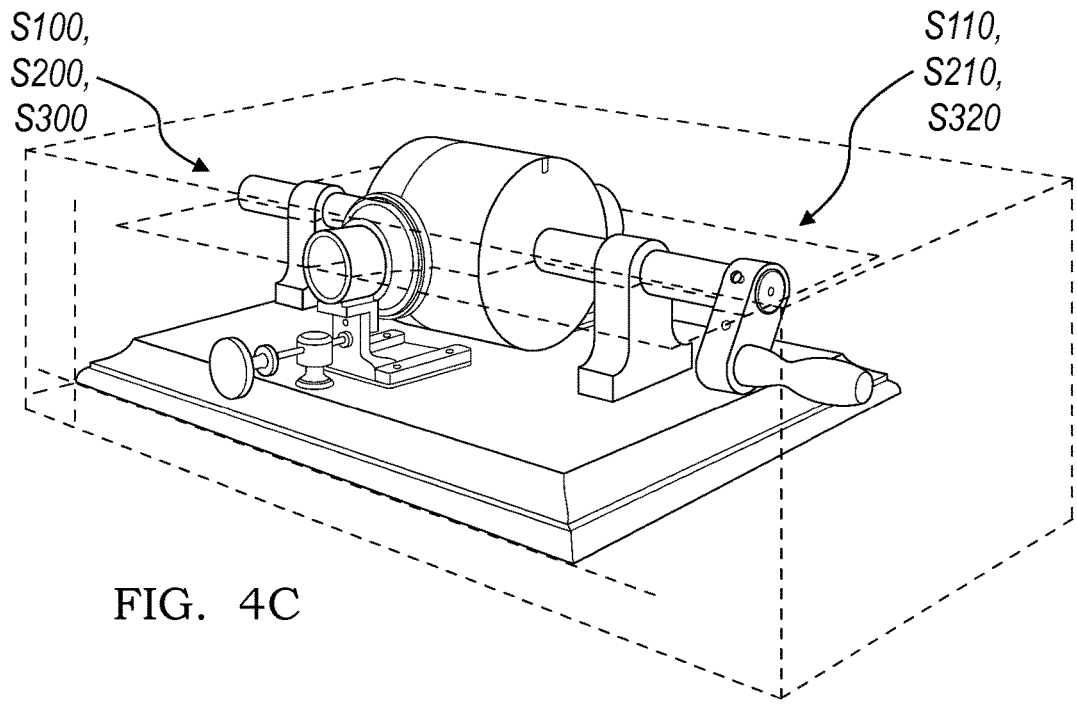

Block S110 can additionally or alternatively receive from the user a selection for a resolution of the virtual object depicted in the real model. For example, Block S110 can receive a maximum (virtual or real) step size between cross-sections in the (virtual or real) model or a maximum ratio of step size to a dimension of the (virtual or real) model along an axis of the model normal to the parallel and offset planes. Block S110 can then implement this selection(s) to select an available substrate material thickness from a list of available substrate sheet materials, to set a substrate thickness, to define a target offset between inked substrates (i.e., a target center-to-center distance to be filled with index-matching fluid or filler panels), etc. For example, Block S110 can set a default center-to-center distance between adjacent substrates and capture cross-sections at a corresponding number of planes within the virtual model, as shown in FIG. 4B, and Block S110 can then set increase the center-to-center distance between adjacent substrates and capture a greater number of cross-sections at corresponding planes within the virtual model, as shown in FIG. 4C.

However, Block S110 can receive a selection for one or more of the foregoing and/or other parameters to control selection of discrete cross-sections of the virtual model through the thickness of the virtual mode.

1.2 Printing Cross-Sections

Block S140 of the method S100 recites, for each cross-section in the series of cross-sections, printing the cross-section over a transparent portion of a dominant face of one substrate in a set of substrates. Generally, Block S140 functions to print an image of one cross-section in the set of cross-sections on each substrate in the set of substrates such that, when the substrates are stacked in Block S160, the images of cross-sections yield a three-dimensional representation of a virtual object in physical space.

Block S140 thus controls selective deposition of one or more colors of ink—in the form of images of cross-sections of the virtual model—onto real substrates. In various examples, Block 140 can interface with an ink jet printer to deposit fluid ink onto substrates, with a laser print to deposit and fuse toner onto substrates, or with an LED electrostatic toner-based printer to deposit and fuse toner onto substrates. Alternatively, Block S140 can interface with a laser etching apparatus supporting a secondary inking process, a xerographic printing or reproduction apparatus, a screen-printing apparatus, or a pen plotting apparatus to control deposition of ink, toner, or other media (from herein after "ink") onto substrates. Block S140 can control deposition of black ink, white ink, and/or colored inks (e.g., cyan, magenta, and yellow inks; red, yellow, and blue inks) onto substrates in the stack, such as based on color value stored in the cross-sections of the virtual model or based on inks supported by the printing apparatus in use. For example, Block S140 can include printing a combination of light-activated cyan ink, light-activated magenta ink, light-activated yellow ink, and light-activated black ink (i.e., CMYK inks) onto a face of a substrate and then expose the substrate to ultraviolet light to cure the combination of light-activated cyan ink, light-activated magenta ink, light-activated yellow ink, and light-activated black ink. Block S140 can also control deposition of inks containing metallic, ceramic, diamond, or other particulate onto substrates, such as a yield a pearlescent appearance to a modeled surface within the real model. However, Block S140 can control printing of any other suitable type of ink onto a substrate.

Block S140 prints ink representative of cross-sections of the virtual model onto transparent substrates such that ink printed on a particular substrate is visible through adjacent substrates when the set of substrates is assembled into a stack. For example, substrates can be of acrylic (e.g., polymethyl methacrylate, or PMMA), polyethylene terephthalate (PET), polypropylene (PP), polyethylene (PE), polycarbonate (PC), curable resin, poly(vinyl chloride) PVC, glass, polyester, vellum, cellulose, sugar, amber, ice, glass, acetate, solidified wax (e.g., paraffin), or other transparent or suitably translucent material. In one example implementation, Block S140 deposits colored toner electrostatically—in the form of images of cross-sections of the virtual model—onto corresponding discrete sheet sheets of PMMA of substantially uniform thickness. In another example implementation, Block S140 interfaces with a print head to deposit food-safe colored ink—in the form of images of cross-sections of the virtual model—onto translucent sheets of cast sugar, such as cast sheets of isomalt or a mixture of white sugar and cream of tartar, to form an edible stack containing a physical representation of the virtual model within.

Furthermore, each substrate in the real model can be of the same or different material and/or substantially identical or differing translucency or color, etc. For example, the stack can include a subset of substrates clear material and a subset substrates of tinted (e.g., red) material (i.e., the substrate is of uniform tint throughout its thickness), and tinted substrates can be interposed between clear substrates to form the stack in Block S160, such as to yield a uniform tinted "glow" of controlled opacity throughout the real without necessitating deposition of ink across a larger surface of the substrates to mimic the tint. Alternatively, in this example, the set of clear substrates can be stacked together, and the set of tinted substrates can be stacked together and arranged adjacent the stack of clear substrates to mimic a shadow over a portion of a scene represented within the real model without necessitating deposition of ink across a larger surface of the substrates to mimic the tint. A substrate can also exhibit uniform optical properties (e.g., transparency and tint) throughout its volume, or a substrate can exhibit a transparent portion and an opaque portion (or a portion that is other than clear and transparent), and Block S140 can thus print selectively over the transparent portion of the substrate or over both the transparent and opaque portions of the substrate according to a desired opacity of ink deposited to the substrate.

Based on a material type selected for the real model, Block S140 can also activate a surface of a substrate onto which ink is to be deposited. For example, acetate-based substrate may exhibit a relatively high surface energy that readily accepts ink, whereas ink deposited onto an untreated acrylic substrate may be less stable. Therefore, for an acrylic substrate, Block S140 can include modifying a surface of the substrate with a corona treatment, by etching the surface with a laser, or roughing the surface with an abrasive such that ink subsequently printed onto the surface is more stable on the substrate. In this variation, Block S140 can print ink—in the form of a cross-section of the virtual model—onto an activated (i.e., high-surface-energy) surface of a substrate and then expose the ink and the substrate to UV light to bond the ink to the surface of the substrate. In another example, Block S140 deposits a coating onto a dominant face of a substrate and then prints ink—in the form of a cross-section of the virtual model—onto the coating, which bonds with the ink to retain the image. However, Block S140 can prepare a surface of the substrate for deposition of ink thereonto in any other suitable way.

In one implementation, Block S140 prints images onto sheets of material of substantially uniform thickness, such as sheets of PMMA 0.3 mm in thickness, and substrates of such substantially uniform thickness can thus be assembled linearly along an axis (e.g., vertically, horizontally) in Block S160 to form the stack. In this implementation, Block S140 can print images onto pre-cut sheets (i.e., substrates) such that the substrates can be assembled into the stack substantially immediately following completion of a deposition of ink thereonto in Block S140. Alternatively, Block S140 can print an image of a cross-section onto an oversized sheet and subsequently trim the oversized sheet down to an appropriate size, as shown in FIG. 1. For example, a one-meter wide, 100-meter long roll of 0.3 mm-thick cellulose acetate can be loaded into a processing center (e.g., a single machine, a collection of processing machines), and Block 140 is executed by the processing center to unroll a 110 mm-long section of cellulose acetate roll, to apply a corona treatment across the width of the 110 mm-long section in 10 mm step increments, to print (with an ink print head) nine distinct cross-sections within nine laterally adjacent 100 mm-wide by 100 mm-long areas spaced apart by 9 mm across the width of 110 mm-long section the cellulose acetate roll, to cure the ink printed across the roll, and to then cut (e.g., with a laser or a blade) each of the nine 100 mm-wide by 100 mm-long areas (now with ink) within the 110 mm-long section of cellulose acetate roll, thereby releasing nine completed 100 mm-by-100 mm substrates, each with an image of a cross-section printed thereonto.

Therefore, as in the foregoing implementation, the method S100 can generate a real model with external boundaries that extend beyond the bounds of a representation of a virtual object contained within the real model. For example, the virtual model can define a single sphere, and the real model can be a cubic stack of substrates, wherein each substrate in the stack is of a discrete thickness (e.g., between 0.03 mm and 5 mm) and defines a substantially identical square footprint such that the virtual sphere represented in physical space within the stack is fully contained within the cubic real model. Alternatively, Block S140 can interface with a processing apparatus (e.g., a laser cutter, a vinyl cutter) to trim each substrate around an image of a cross-section previously printed thereon before the substrates are assembled into a stack in Block S160 such that the completed real model is of a physical form representative of the virtual object. Similarly, Block S140 can interface with a cutting apparatus to cut a substrate to a tracing a perimeter of an image of a cross-section (soon) to be printed on the substrate. However, Block S140 can cut each substrate in the set of substrates into any other form and with any other process to yield a real model of any suitable three-dimensional form upon assembly of the substrates in Block S160, and Block S140 can print any other number of images of discrete cross-sections onto individual, discrete substrates in any other way.

In another implementation, Block S110 receives or generates a single spiral cross-section of the virtual object, wherein the spiral of the cross-section defines an Archimedean spiral of function $r=a+b\theta$ wherein b equals a target center-to-center distance between turns of the spiral. Thus, in this example, Block S110 can flatten the spiral cross-section into a two-dimensional image, Block S140 can print the two-dimensional image onto a single continuous substrate, and Block S160 can roll the substrate into a cylinder according to the same $r=a+b\theta$ function. However, Block S140 can print any other continuous (e.g., spiral) cross-section on any other number of substrates that are later assembled in Block S160 to form a stack, and the substrates can be of any other form (e.g., triangular in cross-section) and can define any other suitable footprint.

Generally, Block S140 prints an image of a cross-section onto a broad surface (i.e., a "dominant face") of a substrate exposed to a print head, silk-screen, etc. For example, "dominant faces" of a substrate can be defined as the two surfaces of the substrate of greatest surface area, wherein a dominant face of one substrate faces a dominant face of an adjacent substrate, such as in contact with the dominant face of the adjacent substrate or offset from the dominant face of the adjacent substrate with fluid or a filler panel arranged therebetween, the separation distance between facing dominant faces being determined by the surface tension of the filling fluid, pressure between and surrounding the substrate, and other electrostatic forces. Block S140 can thus print a singe image of a cross-section onto one dominant face of substrate before the substrate is added to a stack of other substrate in Block S160. Block S140 can also print a sequence of images of different cross-sections over a single dominant face of a substrate. For example, Block S110 can "slice" a virtual model into 1000 layers and capture a cross-section of the virtual model at each of the 1000 layers. However, in this example, the real model can include only 200 substrates, and Block S140 can thus print one image of each of five sequential cross-sections of the virtual model onto a single dominant face of each substrate in the set of 200 substrates, such as to increase a perceived resolution of the physical representation of the virtual model in the stack. Block S140 can additionally or alternatively print on both images of cross-sections of the virtual model onto both sides of a substrate, that is, onto both dominant faces of the substrate. For example, Block S140 can print onto a first dominant face of a substrate one image of a first cross-section of the virtual model and then print onto a second dominant face of the substrate an image of second cross-section adjacent the first cross-section in the virtual model.

Block S140 can also print ink that is removable from substrates, such as to enable the real model to be recycled and substrates reused in a real model of another object or scene. For example, Block S140 can print removable ink onto substrates such that the ink can be mechanically scraped or chemically removed from each substrate in the stack once a useful life of the real model expires. However, Block S140 can function in any other way to print images of cross-sections of a virtual model onto transparent portions of dominant faces of substrate in a set of substrates.

1.3 Stacking Substrates

Block S160 of the method S100 recites assembling the set of substrates into a stack, each substrate in the set of substrates positioned within the stack according to a position within the virtual three-dimensional object of a cross-section printed on the substrate. Generally, Block S160 functions to order a set of substrates—each with one or more images of cross-sections of the virtual model applied thereon—into a stack with adjacent images of cross-sections substantially aligned such that a sensible representation of the virtual model is visually discernible within the physical stack.

In one implementation of Block S160, substrates are stacked with dominant faces in contact with each other. In this implementation, small gaps may exist between regions of adjacent substrates, such as due to small deviations across the dominant face and/or a thickness of the substrates, and Blocks S170, S180, and S190 can thus cooperate to replace air in such gaps with a fluid exhibiting an index of refraction that better matches that of the substrate material.

In another implementation of Block S160, substrates are offset in a stack with a particular offset distance (i.e., a particular center-to-center) distance between adjacent substrates. For example, in Block S160, substrates can be installed in a rack (or frame) with tabs that retain each substrate at a particular offset distance from adjacent substrates. Thus, in this implementation, Blocks S170, S180, and S190 can cooperate to replace air between each substrate with a fluid exhibiting an index of refraction that better matches that of the substrate material.

In a similar implementation of Block S160, transparent filler panels (i.e., blank substrates) are interposed between substrates to fill volumes between adjacent images of cross-sections of the virtual model within the stack. For example, Block S140 can print images of cross-sections onto 100 0.3 mm-thick transparent PMMA substrates, and each of the 100 substrates can be interposed between two of 101 0.2 mm-thick transparent acrylic filler panels in Block S160 to create a ~500.2 mm-thick stack. As in a preceding implementation, gaps may exist between portions of a substrate and an adjacent filler panel, and Blocks S170, S180, and S190 can thus cooperate to replace air in such gaps with a fluid exhibiting an index of refraction that better matches that of the substrate material. Therefore, a number of printed substrates for a volumetric printed stack of a selected depth resolution can be substantially decreased by assembling the substrates with a center-to-center distance between substrates that is substantially greater than a thickness of each substrate.

In Block S160, the substrates can also be arranged within a frame or a casing that maintains the substrates in alignment, and the casing can be subsequently sealed in Block S190 to prevent egress of index-matching fluid from the stack, as described below. However, the substrates can be aligned, assembled, and/or retained in a stack in any other suitable way in Block S160.

1.5 Index-Matching

Block S170 of the method S100 recites drawing a partial vacuum (from herein after "vacuum") around the stack, Block S180 of the method S100 recites, in the presence of the vacuum, introducing a transparent fluid to interstices between substrates in the stack, an index of refraction of the transparent fluid approximating an index of refraction of a substrate in the set of substrates, and Block S190 of the method S100 recites releasing the vacuum around the stack. Generally, Blocks S170, S180, and S190 cooperate to replace air (and/or other gases) between dominant faces of adjacent substrates within the stack (and printed mages on the substrates) with a fluid exhibiting optical properties (e.g., index of refraction, Abbe number, etc.) that better match those of the substrate material, thereby reducing internal reflection of light within substrates in the state, increasing total transparency of the stack, and yielding a stack that more closely approximates a continuous material throughout its volume. For example, without an index-matching material, a stack of substrates may appear substantially opaque due to reflections at boundary layers of adjacent substrates, and a scene represented within the stack may therefore not be viewable. However, by filling interstices between substrates in the stack, Blocks S170, S180, and S190 can reduce internal reflections within the stack, thereby increasing transparency of the stack to yield a representation of the virtual model that is visible from outside the stack.

Regions between adjacent substrates and/or between substrates and adjacent filler panels can therefore be filled with a suitable index-matching material, such as water (e.g., distilled water, salt water), ice, oil (e.g., baby oil, silicone oil), a gel, wax (e.g., mineral oil-based gel wax), or an adhesive (e.g., UV-cured transparent adhesive), etc., such as through pouring, pumping, wiping, capillary action, or bulk injection, etc. A vessel (or frame, etc.) containing the stack can be filled with the same or similar index-matching material such that the index-matching material fills interstices between substrates in the stack and interior surfaces of the vessel. In particular, the fluid can fill volumes between the stack and the vessel containing the stack to enable visibility of the representation of the virtual model within from substantially 360° about the vessel. The index-matching material can also be cured, hardened, or dried from a fluid to a solid or from a fluid of one viscosity to a fluid of a higher viscosity.

The index-matching material can exhibit an index of refraction, an Abbe number, and other optical property that substantially matches that (or those) of the substrate material, filler material, and/or ink, etc. such that the physical representation of the virtual model within the completed stack can be seen by a user at relatively high viewing angles. Alternatively, the index-matching material can exhibit an index of refraction that is (slightly) greater than an index of refraction of the substrate material to substantially the completed stack from forming a total internal reflection light guide, that is, to prevent the completed stack from "light locking" at certain viewing angles. Similarly, the index-matching material can exhibit an index of refraction that is less than an index of refraction of the substrate material to reduce edge reflections within the completed stack at certain viewing angles.

The index-matching material can remain substantially fluid throughout a lifespan of the stack, such as for an index-matching material that includes water or silicone oil. Alternatively, the index-matching material can be applied over dominant faces of substrates before assembly or drawn into the assembled stack as a fluid that changes phase to a solid once the stack is assembled. For example, a transparent wax can be heated to transition the wax from a solid into a liquid, the wax injected between adjacent substrates in the stack, and the stack then cooled to harden the wax into a solid. The index-matching material can also function to retain adjacent substrates in position. For example, the index-matching material can include a light-curing adhesive that is substantially transparent when cured, and the adhesive can be spread across dominant faces of the substrates, the substrates assembled and aligned in a stack, the stack compressed—normal to the dominant faces of the substrates—in a fixture to press excess adhesive from the stack, the stack degassed in a pressure vessel, and the stack exposed to ultraviolet light to cure the adhesive.

The index-matching material can also be selected based on other material properties of the substrate material and/or the filler panel material. For example, silicone oil can be selected for glass substrates but not for PMMA or urethane substrates to a tendency of PMMA and urethane to absorb silicone oil.

In one implementation, index-matching material is applied to dominant faces of the substrates in Block S180 prior to assembly of the stack in Block S160, such as by printing ink and then printing index-matching material onto a dominant face of a substrate, spraying index-matching material onto a substrate, dripping or wiping the index-matching material onto each substrate, exposing each substrate to a gaseous form of the index-matching material, or setting a sheet of index-matching gel over a dominant face of a substrate. In this implementation, the stack—now with index-matching material arranged between substrates—is set inside a pressure vessel and a vacuum is drawn on the stack in Block S170 to draw any remaining gas (e.g., air) from the stack, to outgas the substrates, and/or to outgas the index-matching material. For example, the stack can be held at vacuum within the pressure vessel for a period of time based on a viscosity of the index-matching material in Block S170 (i.e., to ensure that gas can move out of interstices between substrates), wherein stacks containing less viscous index-matching materials are held in vacuum for a period of time (e.g., two minutes) short than stacks containing more viscous index-matching materials (e.g., twenty-four hours). Similarly, a stack containing more volatile index-matching material or substrates of a more volatile material can be outgassed for extended periods of time in Block S170 to reduce opportunity for the index-matching material and/or the substrates to later outgas into interstices between substrates, which could otherwise yield gaseous pockets that obstruct visibility through the stack. Furthermore, as in the example described above in which the substrates are assembled in a stack and then compressed normal to the dominant faces of the substrates, vacuum can be drawn on the stack in Block S170 for a period of time based on a mechanical pressure between substrates. Similarly, the stack can be exposed to vacuum within the pressure chamber in Block S170 for a period of time based on a dimension (e.g., a maximum dimension) of the stack. For example, Block S170 can implement a parametric model to calculate a vacuum time based on a maximum width dimension and a maximum length dimension of a dominant face of a substrate in the stack.

In one example of the foregoing implementation Block S140 deposits food-safe ink onto substrates of cast sheets of sugar, water, alcohol, or an other food-safe transparent liquid capable of superficially dissolving the substrates is deposited onto broad faces of the substrates in Block S180 as the substrates are arranged into a stack in Block S160. The stack can then be compressed normal to a dominant face of a substrate in the stack, such as under elevated temperature to superficially melt adjacent dominant faces of the substrates, thereby forming a substantially continuous volume of translucent solidified sugar with colored ink(s) contained within to yield a physical representation of the virtual model.

In another example of this implementation, the index-matching material of a known viscosity is applied to dominant faces of the substrates, and the substrates are assembled into the stack such that offset distances between adjacent dominant faces of the substrates is controlled by the index-matching material according to surface tension and viscosity of the index-matching material. In this example, the stack can also be compressed—normal to the dominant faces of the substrates—up to a specified pressure to control offset distances between adjacent dominant faces of the substrates.

In another implementation, the stack is assembled "dry" (i.e., without index-matching material) in Block S160, and the stack is then placed within a pressure vessel. A vacuum is then drawn on the pressure vessel over a first period of time (e.g., twenty seconds to twenty-four hours) in Block S170, and a portion of the pressure vessel is filled with a transparent index-matching fluid in Block S180 once the first period of time expires. With vacuum maintained within the pressure vessel, the fluid is then drawn into interstices between substrates over time via capillary action. As described above, the vacuum can be maintained over the stack to further degas the substrates and/or the fluid.

Figure 8:
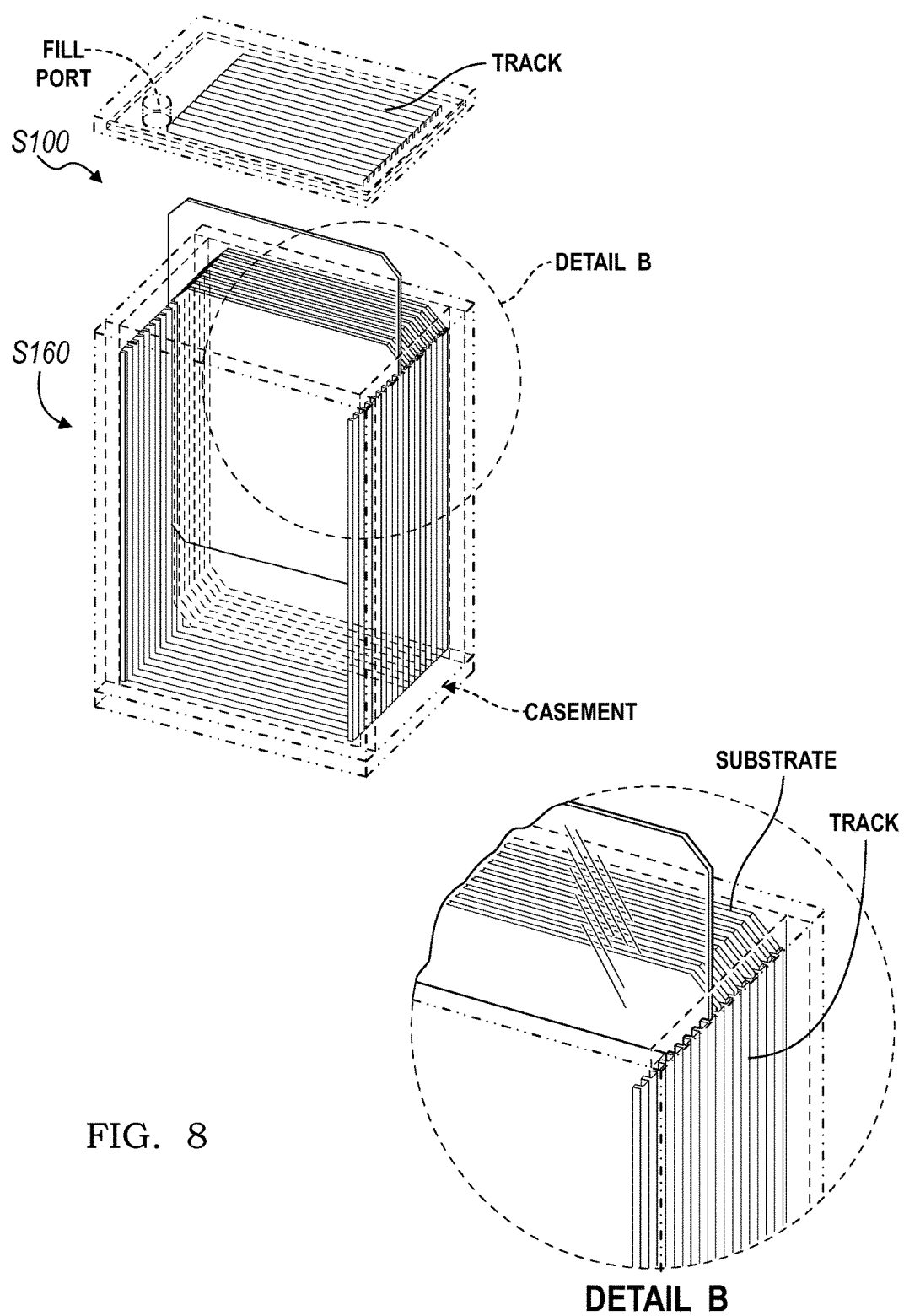
FIG. 8 is a schematic representation of one variation of the first method.

In this implementation, the substrates can be set in a form (e.g., a frame) that maintains the offset distance between dominant faces of adjacent substrates in the stack. For example, the substrates can be placed in a five-sided casement defining a series of tracks that retain the substrates in position, such as shown in FIG. 8. Furthermore, in this example, the casement can include a lid that is sealed (e.g., by gluing, by polymer seal) over an opening of the casement to fully enclose the stack of substrates within. The lid can also define a fill port through which index-matching material can be injected into or introduced to the stack, as shown in FIG. 8. Alternatively, a (porous) coating can be applied to dominant faces of the substrates, wherein the coating is of thickness that is half a target offset distance between adjacent substrates to maintain the offset distance between adjacent substrates when the stack is assembled. For example, the coating can yield an array of bumps on each substrate. In another example, the coating can include grains of microspheres deposited onto each substrate. Similarly, the substrates can be etched (prior to printing images thereon in Block S140) to form troughs and ridges such that, when the stack is assembled, adjacent substrates form conduits (e.g., "veins") of appropriate cross-section to wick fluid through fully across the junction between adjacent substrates. Yet alternatively, the stack can be compressed normal to dominant faces of the substrates, such as based on a surface area of the dominant faces, to control contact (or offsets) between dominant faces of adjacent substrates. For example, Block S180 can calculate a clamping force for the stack based on a dimension of a substrate in the stack, a material of a substrate in the stack, and a type of the transparent fluid, and the stack can be clamped according to calculated clamping force in Block S160 prior to introduction of the index-matching material to the stack in Block S180.

In a similar implementation, Blocks S170, S180, and S190 can be implemented by a bulk injection system including a pressure vessel, a reservoir containing index-matching fluid (e.g., water, adhesive, gel), a solenoid for controlling flow of index-matching fluid into the pressure vessel, and a vacuum pump for drawing vacuum on the pressure vessel, as shown in FIGS. 7A, 7B, and 7C. In this implementation, index-matching fluid within the reservoir can be degassed to lower an amount of dissolved air within the fluid, and the assembled (dry) stack of substrates can then be placed on a titled platform inside the pressure vessel with a particular corner of the stack defining a highest vertical point within the system, as shown in FIGS. 7B and 7C. The solenoid is then tripped to release degassed index-matching fluid from the reservoir into the pressure vessel to immerse the stack in index-matching fluid. For example, the reservoir can be connected direction to a stack via a supply line connected to a fill port in a casement containing the stack of substrates, as shown in FIGS. 7C and 8. In another example, the volume around the stack within the pressure vessel is flooded with the index-matching material. The pressure vessel is subsequently sealed and a vacuum drawn on the pressure vessel by the vacuum pump in Block S170 to draw air (and other gases) out of the stack. After a suitable period of time, the pressure vessel is opened to ambient pressure, thereby forcing index-matching fluid into interstices between adjacent substrates in the stack in Block S180. This process of drawing and releasing vacuum on the stack in the presence of index-matching fluid can be repeated to force additional index-matching fluid into the stack. Eventually, the index-matching fluid can be drained from the pressure vessel and the stack removed in Block S190.

Upon completion of a vacuum period, the atmospheric pressure can be established within the pressure vessel and the stack then removed from the pressure vessel in Block S190. Alternatively, upon completion of the vacuum period, positive pressure can be established within the pressure vessel and the periphery of the stack sealed such that contents (i.e., the substrates, the index-matching material) within the stack are sealed within a positive pressure atmosphere, thereby inhibiting outgassing of the contents of the stack and reducing opportunity for gas pockets to form between substrates within the stack over time. For example, for a stack filled with a silicone oil index-matching material, the stack can be sealed with positive internal pressure that inhibits phase change of the silicone oil from liquid to gas.

Furthermore, as described above, the index-matching material can include a curable adhesive or a resin. For example, the index-matching material can be UV-curable resin, and the stack can thus be exposed to UV light upon removable of the stack from the pressure vessel, thereby curing the resin. In another example, the index-matching material can be an adhesive that cures at elevated temperature, and the stack can thus be placed in an oven or an autoclave to active and cure the adhesive. However, the index-matching material can be cured in any other way—during or after the vacuum process—to retain substrates (and filler panels) in position in the stack.

In another example in which Block S140 deposits food-safe ink onto substrates of cast sheets of sugar, the stack of sugar-based substrates can be stacked in Block S160, the stack can be placed in a vacuum chamber and a (partial) vacuum drawn on the stack, and a volume of water, alcohol, or other food-safe transparent liquid can be introduced to the stack under vacuum in Block S180, as described above. Thus, as the fluid is draw between interstices between adjacent substrates, the water, alcohol, or other fluid can dissolve sugar crystals along dominant faces of the substrates. However, as the water, alcohol, or other fluid evaporates from the stack, dissolved sugar molecules recrystallize across interstices between adjacent substrates to form a substantially continuous volume of translucent solidified sugar with colored ink(s) contained within. In this example, the stack can additionally or alternatively be heated and then cooled in Block S180 to reflow and harden portions of the substrates into a single continuous volume of material with ink trapped within, and the stack can be compressed normal to a dominant face of a substrate within the stack to displace pockets of air or other gases from the stack and/or to yield more uniform growth of sugar crystals within the stack.

Alternatively, substrates within the stack can be bound together after the vacuum process (i.e., upon completion of Blocks S170, S180, and S190) or in place of the vacuum process. In one example, the stack is arranged in a (transparent) clamping fixture that retains the substrates in position. In another example, adjacent edges of the substrates (and filler panels) are melted together, such as chemically, by heating the perimeter edges of the substrates in the stack on a hot plate, or by passing a hot blade or a hot wire through the stack across the substrates. In another example, the stack is constraining a clear rigid box or a clear soft bag, which can be further filled with index-matching fluid and sealed. In yet another example, the entire stack can be heated and compressed to melt the substrates (and filler panels) into a single cohesive structure with ink trapped therein. In another example, edges of the stack can be dipped into a molten material substantially identical to the substrate material to seal and retain the edge faces of the substrates in the stack.

However, the first method S100 can be implemented in any other way to manufacture a physical volumetric representation of a virtual three-dimensional object or scene.

2. Second Method: Printed Polymer Layers and Applications

As shown in FIG. 2, a method for manufacturing a physical volumetric representation of a virtual three-dimensional object includes: receiving a series of adjacent cross-sections of the virtual three-dimensional object in Block S210, the series including a first cross-section of the virtual three-dimensional object and a second cross-section of the virtual three-dimensional object; depositing a first layer of transparent polymer over a build platform in Block S220; curing a portion of the first layer of transparent polymer in Block S230; with ink, printing an image of the first cross-section onto a cured exposed dominant face of the first layer in Block S240; depositing a second layer of transparent polymer over the first layer of transparent polymer in Block S222; curing a portion of the second layer of transparent polymer in Block S232; with ink, printing an image of the second cross-section onto a cured exposed dominant face of the second layer according to an order of the series of cross-sections in Block S242; and releasing a stack of layers including the first layer of transparent polymer and the second layer of transparent polymer from the build platform in Block S250.

Generally, like the first method S100 described above, the second method S200 can be implemented in manufacture of a three-dimensional volumetric "print" exhibiting a three-dimensional graphic representation of an object or multiple objects, such as a scene, in physical space. However, the second method S200 interfaces with a first print head to deposit a transparent polymer into a series of stacked layers and with a second print head (or similar apparatus) to deposit ink onto each layer before a subsequent layer is printed thereover. Therefore, rather than printing on discrete substrates and arranging the discrete substrates into a stack as in the first method S100, the second method S200 can "print" a first substrate, print onto the first substrate an image of a first cross-section of a virtual object to be physically represented in a real model, print a second substrate over the first substrate and the image of the first cross-section, print onto the second substrate an image of a second cross-section of the virtual object, and so on until the full thickness of the virtual object to be represented physically in the completed real model.

For example, the second method S200 can control a first print head to deposit a sequence of planar UV-curable translucent resin layers (i.e., substrates) of substantially uniform thickness, such as successive resin layers 0.01 mm to 5 mm in thickness desired resolution of the real model. The second method S200 can also control a light source to cure each successive layer of resin by exposing the layer to UV light for a particular period of time, interface with a print head to deposit UV-curable ink in the form of a cross-section of the virtual model on successive layer of cured resin, and then again control the same or other light source to cure the ink via exposure to UV light. Thus, the second method S200 can print a successive resin and ink layers to generate a real model that represents a virtual model in physical space.

2.1 Cross-Sections

Block S210 of the second method S200 recites receiving a series of adjacent cross-sections of the virtual three-dimensional object, the series including a first cross-section of the virtual three-dimensional object and a second cross-section of the virtual three-dimensional object. Generally, Block S210 functions like Block S110 of the first method S100 to collect and/or generate a series of cross-sections corresponding to a virtual model to be represented in physical space by printing images of the cross sections on a sequence of substrates (i.e., printed polymer layers) in subsequent Blocks of the second method S200.

2.2 Printing Substrates

Block S220 of the second method S200 recites depositing a first layer of transparent polymer over a build platform, and Block S222 of the second method S200 recites depositing a second layer of transparent polymer over the first layer of transparent polymer. Generally, Blocks S220 and S222 functions to deposit a sequence of layers of material, each of a particular depth and footprint over a surface, such as the base of a build chamber within a three-dimensional printer or a previous layer of the material. For example, Block S220 can print a planar layer of photo-curable resin 0.3 mm in thickness, 80 mm in width, and 100 mm in length over a previous layer of the same footprint and thickness. In this example, Block S222 can then print another layer of the material on top of the previous layer to create a rectilinear stack as in the first method S100. Alternatively, Block S220 and Block S222 can print layers of various differing thicknesses, such as based on different resolution requirements at various depths within the stack.

Block S220 and Block S222 can additionally or alternatively print layers of differing footprints, such as to create the real model that exhibits a physical geometry representative of the virtual model. For example, Blocks S220 can print a first layer of material with a footprint substantially identical to a first cross-section of the virtual model generated in Block S110, Block S230 can print the first cross-section onto the first layer, Block S222 can print a second layer of material with a footprint substantially identical to a second cross-section of the virtual model—different from the first cross-section—generated in Block S110, and Block S232 can print the second cross-section onto the second layer, etc. such that the completed real model both contains a visual representation of the virtual model in the form of ink between layers and defines a three-dimensional physical representation of the virtual model. Blocks S220 and S222 can similarly trim corresponding layers of deposited polymer to various footprints. For example, a laser cutter or mechanical knife integrated into the 3D printer can execute Block S220 to trim excess material from a corresponding layer of polymer, such as once the layer is cured in Block S230, thereby yield a substantially crisp, straight edge around a perimeter of the layer. In these implementations, Blocks S220 and S22 can also print sacrificial support structures to support overhanging regions of corresponding layers, and the sacrificial support structures can be dissolved or otherwise removed from the stack once deposition of the ink and layers of polymer is complete.

Block S220 and Block S222 create the stack by depositing a material that is substantially transparent or that is substantially transparent when cured. For example, Block S220 can deposit a transparent thermoform plastic, such as acrylic, by dispensing raw material into a heated print head, heating the raw material above a glass phase change temperature, dispensing the now-fluid material from the print head onto a build platform or a previous layer of material within a build chamber, and then allowing the deposited layer to cool before dispensing a second layer or ink there over in Block S222 or Block S230, respectively.

Alternatively, Block S220 can deposit light-activated resin (e.g., UV-curable resin, photo-curable resin) over the build platform or previous layer of material. For example, Blocks S220 and S222 can execute on a "3D printer" incorporating a controllable light source and arranged within a dark room and thus control the 3D printer to deposit a sequence of layers of viscous photo-curable resin that is substantially transparent once cured. In this example, Block S230 can trigger the light source to expose the layer(s) to UV light to cure the layer(s), such as after each layer is deposited and before ink is applied, after a subset of layers are deposited, or after the complete stack is printed. Furthermore, in this example, the viscosity of the resin can be selected or set such that a new layer of material flows over a previous layer of material smoothly and controllably but substantially without pockets of trapping air within the new layer of between the new and previous layers. For example, Blocks S220 and S222 can interface with the 3D printer to control a heater within the build chamber and/or a heater within the print head according to a target print temperature at which the resin exhibits preferred or target flow characteristics (e.g., viscosity). However, Blocks S220 and S222 can cooperate in any other way to manufacture a sequence of substantially transparent layers of the same or different footprint and thickness and of any other suitable transparent or translucent material.

Block S230 of the second method S200 recites curing a portion of the first layer of transparent polymer, and Block S232 of the second method S200 recites curing a portion of the second layer of transparent polymer. Generally, Blocks S230 and S232 function to set and/or cure respective layers of the polymer material prior to deposition of ink thereonto. In one example, Blocks S230 and S232 fully cure respective polymer layers prior to deposition of ink thereonto, such as by overexposing layers of UV-curable ink with light from an adjacent light source, and Block S240 and S242 can thus print corresponding images of cross-sections onto fully-cured polymer layers. Alternatively, Blocks S230 and S232 can expose corresponding polymer layers to curing procedures sufficient to set and/or cure only a portion of a thickness of each layer. For example, Block S230 can cure only a film of a layer across a dominant face of the layer—adjacent a print head—to less than a full thickness of the layer, and Blocks S240 can print onto a cured film of layer though material beneath the film may not be fully cured. In this example, once deposition of all layers and ink in the stack is complete, Blocks S230 and S232 can further expose the stack to the curing process of cure any material within the stack that remains uncured or 'loose.' However, Blocks S230 and S232 can additionally or alternatively cure material in layers of the stack during deposition of the polymer into corresponding layers and/or upon completion of deposition of polymer layers and ink into the stack.

In an implementation in which the polymer is a photo-curable polymer, Blocks S230 and S232 can interface with a light source to expose the layers of polymer to light. For example, Blocks S230 and S232 can interface with a light source coupled to a 3D printing apparatus to expose each successive layer of the polymer to light for a duration of time corresponding to a thickness of a layer once the layer is fully deposited. Block S230 (and Block S232) can further delay a time between deposition of the layer and exposure of the layer to the curing process. For example, Block S230 can set a delay time for the curing process based on a viscosity of the polymer, a step-over distance of the print head during deposition of the layer, a vibratory setting of a build platform supporting the stack, and/or a particular vacuum drawn around a build chamber containing the stack, etc. such that substantially all air (or other gases) trapped within the fresh layer of material is evacuated therefrom prior to curing the layer.

In another implementation in which the polymer is a high-temperature-cure polymer, Blocks S230 and S232 can interface with a heating element adjacent the stack to execute a heating schedule to cure one or more layers of the polymer. For example, Blocks S230 and S232 can interface with a heat lamp coupled to a print head of 3D printing apparatus to radiate heat onto each successive layer of polymer for a duration of time corresponding to a thickness of a layer, an ambient air temperature, a temperature of a preceding layer during deposition of the layer, etc. once the layer is fully deposited from the print head onto a preceding layer of polymer.

In yet another implementation in which the polymer is cured by a chemical catalyst, Blocks S230 and S232 interface with a nozzle and pump within the 3D printer to spray a catalyst onto a layer of polymer to cure the layer. Similarly, the 3D printer can mix the polymer material and the catalyst as the material is dispensed out of the print head and onto a build platform or onto a previous layer of the polymer. In this implementation, Blocks S240 and S242 further delay deposition of ink onto corresponding layers based on an estimated cure status of the layers, such as based on a model linking curing time to layer thickness, catalyst ratio, etc.

In another implementation, Blocks S220 and S222 dispense a sugar-based syrup, and Blocks S230 and S232 cure dispensed volumes of the syrup into corresponding translucent layers prior to dispensation of inks onto dominant faces of the layers in Block S240 and S242. For example, Blocks S220, S222, S230, S232, S240, and S242 can be executed by a three-dimensional printing machine including a planar build platform that runs vertically inside a bounded wall below a print head. In this example, the Block S220 sets a top surface of the build platform to a particular distance below a top edge of the bounded wall and dispenses a first preset volume of a heated sugar-based syrup (e.g., an isomalt syrup at 425° F., or a mixture of white sugar and cream of tartar). In this example, the three-dimensional printing machine then hardens the first volume of syrup into a first transparent (or translucent) layer of sugar—such as by (rapidly) cooling the build platform and the bounding wall, by heating the boundary wall and the build platform to evaporate moisture from the syrup, and/or by drawing a partial vacuum around the first volume of syrup to evaporate moisture therefrom—in Block S230 before printing a first image of a corresponding cross-section onto the hardened layer in Block S240. The three-dimensional printing machine can then execute Block S222 by indexing the build platform downward away from the print head by a distance approximating a thickness of the first layer of hardened syrup and dispensing a second volume of the syrup over the first layer and the first image, can execute Block S232 by curing (e.g., hardening) the second layer as described above, and can execute Block S242 by printing a second image of a corresponding cross-section onto the hardened second layer. Alternatively, in another example of this implementation, the three-dimensional printing machine can include a heated print head (e.g., nozzle) that heats moistened grains of sugar into syrup, and the printing machine executes Blocks S220 and S222 by forcing sugar through the heated print head and rastering the print head over the build platform or a previous layer of hardened sugar to form each subsequent layer. In this example, the three-dimensional printing machine can execute Blocks S230 and S232 by cooling a deposited layer of sugar (E.g., by blowing air across the layer) or by waiting sufficient time for the layer to harden before executing Blocks S240 and S242.

However, Blocks S220 and S222 can deposit sequential layers of any other suitable type of material, and Blocks S230 and S232 can function in any other way to cure all or a portion of the corresponding layers.

2.3 Printing Ink

Block S240 of the second method S200 recites, with ink, printing an image of the first cross-section onto a cured exposed dominant face of the first layer, and Block S242 of the second method S200 recites, with ink, printing an image of the second cross-section onto a cured exposed dominant face of the second layer according to an order of the series of cross-sections. Generally, Blocks S240 and S242 function like Block S140 of the first method S100 described above to deposit colored inks (e.g., cyan, magenta, yellow, black, and/or white inks) onto a dominant face of a corresponding layer of polymer recently printed (and cured). In particular, Block S240 (and Block S242) can print a two-dimensional representation of a corresponding (e.g., first) cross-section onto a (cured) dominant face of a corresponding (e.g., a first) layer.

In one implementation, Block S240 (and Block S242) interfaces with a print head to deposit a combination of light-activated cyan ink, light-activated magenta ink, light-activated yellow ink, and light-activated black ink onto a cured exposed dominant face of a corresponding layer of transparent polymer. In this implementation, like Block S230, Block S240 can further cure deposited ink by exposing the fresh ink to light. For example, Blocks S230 and S240 can interface with the same light source within the 3D printer to expose light-activated ink. Alternatively, Block S240 can control a second light source within or adjacent the 3D print to cure the fresh ink. However, Block S240 (and Block S242) can print any other type of ink of any other color and can cure deposited ink in any other suitable way.

Blocks S220, S222, S230, S232, S240, and S242 can therefore cooperate to control one or more printing apparatuses to deposit a sequence of polymer layers with images of cross-sections of a virtual model printed between polymer layers. For example, Blocks can S220, S222, S230, S232, S240, and S242 be executed by a single apparatus or manufacturing system incorporating a first print head that dispenses a transparent polymer, a second print head that dispenses a colored ink (e.g., one print head that dispenses various colors of ink or multiple print heads that each dispense one ink color), one or more material curing subsystems (e.g., one or more light sources directed toward a building platform), a build platform that supports deposited polymer layers, an X- and Y-axis table that moves the print heads laterally and longitudinally relative to the build platform, and a Z-axis actuator that moves the print heads vertically relative to the build platform. However, Blocks S220, S222, S230, S232, S240, and S242 can be executed on any other one or more apparatus to print ink and polymer to generate the real model that represents the virtual model in real space.

2.4 Post Processing

Block S250 of the second method S200 recites releasing a stack of layers including the first layer of transparent polymer and the second layer of transparent polymer from the build platform. Generally, Block S250 functions to release the stack upon completion of deposition of ink and polymer layers for each cross-section in the set of cross-sections of the virtual model. For example, the stack can be broken off of a support structure on a build platform within the 3D printer, pried off the build platform, or released from a vacuum clamping system within the 3D printer.

Once the stack is released, the stack can be post-processed. In one implementation, external surfaces of the stack are smoothed to reduce reflections and refraction of light at the surfaces of the stack. For example, the stack can exhibit rough surfaces along edges of the layers, and these faces of the stack can be placed on a hot planar surface to melt these rough faces into substantially planar faces that exhibit improved optical clarity. Alternatively, these faces can be machined to planar, polished chemically, and/or polished mechanically. Yet alternatively, the stack can be machined, etched, laser cut or ablated, compression molded, melted, or otherwise formed into an other three-dimensional (e.g., non rectangular) form upon completion of the additive build cycle. However, the stack can be processed in any other way in Block S250 following completion of the build cycle in Blocks S220, S222, S230, S232, S240, and S242, etc.

2.5 Porous Layers and Applications

Figure 9:
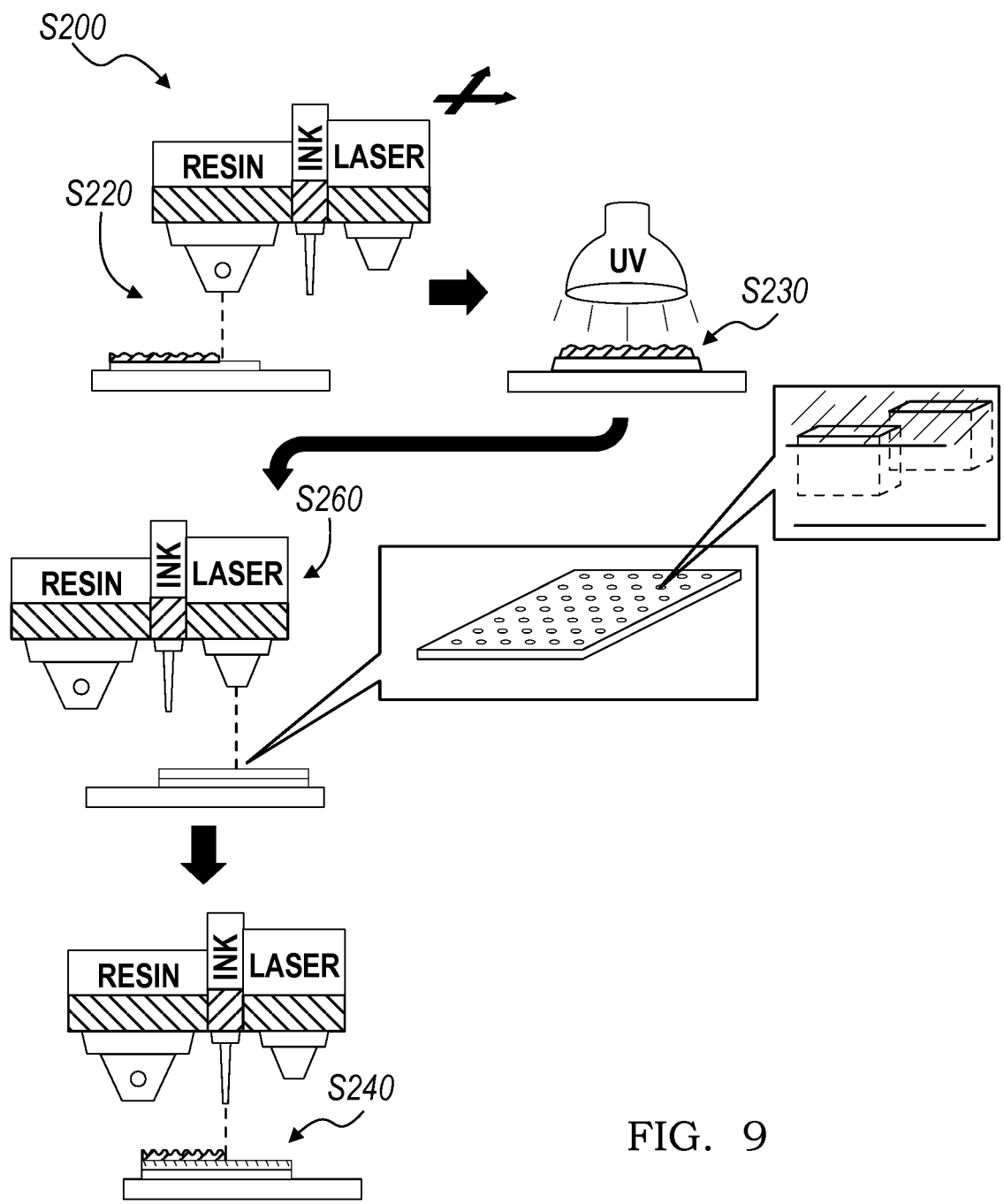
FIG. 9 is a flowchart representation of one variation of the third method.

As shown in FIG. 9, one variation of the second method S200 further includes Block S260, which recites etching the exposed dominant face of a layer to create pores in the exposed dominant face of the layer. Generally, Block S260 functions to create pores in a deposited layer of polymer prior to deposition of ink onto the layer such that deposited into may bleed into the pores in the layer, thereby increasing a depth of ink contained by the single layer and increasing a viewing angle (relative to adjacent dominant faces of layers within the assembled stack) of the real model at which the physical representation of the virtual object is visible. Block S260 can thus form pores across dominant faces of substrates to improve 360° visibility of the physical representation of the virtual model within the stack. For example, Block S260 can form pores in a substrate that are of depth less than a thickness of the substrate, such as ~50% of the thickness of the layer. Alternatively, Block S260 can create pores that extend through a full thickness of the layer to a layer below, thereby linking images of cross-sections on dominant faces of adjacent layers. Block S260 also form a substantially uniform array of pores across all or a portion of a layer, such as 100 pores per square centimeter across the dominant face of a layer, or a substantially random pattern of substantially uniform or (widely) varying pore density across all of a portion of a dominant face of a layer. For example, Block S260 can create a high density of pores in a first area of a dominant face of a layer to yield perception of a darker shadow in the first area in the real model, and Block S260 can create a lower density of pores in a second area of the dominant face to mimic a lighter shadow in the second area in the real model.

In one implementation, the second method executes on the 3D printer that further includes a laser diode coupled to a laser output optic mounted adjacent the print head(s), and the 3D printer implements Block S260 by rastering a laser beam from the laser output optic across the dominant face of a cured (or semi-cured) first layer of polymer material to etch a substantially uniform array of pores to a depth less than a thickness of the first layer across the dominant face, as shown in FIG. 9. Block S240 can subsequently deposit ink across the dominant face, and deposited ink can wick into adjacent pores in the first layer to increase an effective depth of visual information stored in (i.e., printed onto) the first layer. In this implementation, Block S222 can print a subsequent (i.e., second) layer of polymer material over the first layer, and uncured polymer material can similarly wick into pores not filled with ink prior to curing the second layer such that the pores are not substantially visible in the completed real model. Block S260 can therefore includes irradiating an exposed dominant face of a layer with a laser beam to create an array of pores in the first layer at a depth less than a thickness of the first layer.

In a similar implementation, the 3D printer rasters the laser beam from the laser output optic across an area of the layer only over which an image of a cross-section will subsequently be printed. In this implementation, Block S240 (and Block S242) can further print ink volumes onto the dominant face of the corresponding layer according to volume of open pores within an area of the dominant face onto with a corresponding image of a cross-section will b printed. Block S240 can therefore cooperate with Block S260 to dispense sufficient ink onto a "porous" dominant face of a layer to substantially ensure that all pores in the dominant face will be filled with ink, thereby reducing likelihood that air will be trapped in pores of one layer when polymer material of a subsequent layer is dispensed thereover.

However, Block S260 can additionally or alternatively form pores in the dominant face of a layer by stamping, drill, bulk micromachining, mechanically cutting, or through any other suitable process or technique. Block S260 can also create pores that are cylindrical, elliptical or rectilinear in cross-section, or of any other form or section.

The first method S100 can similarly print images of cross-sections onto porous substrates. For example, Block S140 can print images on substrates that are preformed with pores, such as by injection molding, stamping vacuum forming, machining, etching, laser ablating, casting, or otherwise forming pores into pre-form sheets of transparent material. Alternatively, the first method S100 can include stamp, cut, mold, or otherwise form an array of pores in a substrate in situ just before or during deposition of ink in the form of an image of a cross-section of the virtual model onto a dominant face of the substrate. However, the first method can print images of cross-sections of the virtual model onto substrates of any of form and incorporating any other suitable feature.

2.6 Magnets

In one variation, the second method S200 includes forming a bore in a substrate in the set of substrate and installing a magnetic element into the bore in the substrate assembled into the stack. Generally, in this variation, the second method S200 can incorporate an element into the stack such that the stack can interface with (e.g., couple to) another stack via the magnetic element. For example, Block S220 can deposit a rectangular first layer of transparent material that defines a recess at each corner and then print a slurry of epoxy and magnetic powder into each recess, Block S230 can cure the slurry into magnetic inserts, and Block S222 can deposit a second layer of transparent material over the recess to enclose the cured slurry. Once manufacture of the stack is completed, the cured magnetic inserts can attract the stack to similar magnetic inserts in another stack. Alternatively, Block S220 can deposit a layer of transparent material defining one or more bores, and magnetic elements can be inserted into each bore upon completion of a last layer of transparent material onto the stack. Yet alternatively, bores can be drilled, etched, bulk micro-machined, or otherwise formed into the stack, and magnetic (or ferrous) elements can be pressed into, glued into, or otherwise installed into the bores such that the stack interfaces with one or more other stacks similarly including magnetic and/or ferrous elements.

In this variation, the stack can contain a physical representation of a first virtual model and can interface with a second stack—via the magnetic inserts—containing a physical representation of a second virtual. For example, the (first) stack can include a physical representation of a human, a second stack can include a physical representation of a tree, a third stack can include a physical representation of a bird, a fourth stack can include a physical representation of a grassy knoll, and a fifth stack can include a physical representation of a sun, and each stack in the set can include magnetic elements that transiently retain the stacks against each other. In this example, a user can rearrange the stacks, such as to move the physical representation of the human from behind the physical representation of the tree to in front of the tree, and the magnetic elements can retain the assembly of five discrete stacks in a position thus set by the user.

In this variation, the second method S200 can thus incorporate one or more magnetic or ferrous elements into the stack such that the stack may be transiently connected to one or more other stacks similarly including magnetic or ferrous elements. For example, for each cubic stack, the stack can include a magnetic element in each of its corners for a total of eight magnetic elements, proximal a center of each face for a total of six magnetic elements, or near a center of each edge of each face of the stack for a total of twenty-four magnetic elements. The magnetic elements can also be installed directionally into the stack. For example, north and south poles of each magnetic can be phased in the stack according to pole scheme such the stack can interface with (e.g., magnetically couple to) other stacks in a limited number of controlled orientations. However, the second method S200 can incorporate any other number of magnetic elements in any other way into the stack.

The first method S100 can incorporate similar methods or techniques to install one or more magnetic elements into the stack such that the stack can interface with one or more stacks similarly incorporating magnetic and/or ferrous elements.

3. Third Method: Cross-Section Generation and Applications

Figure 3:
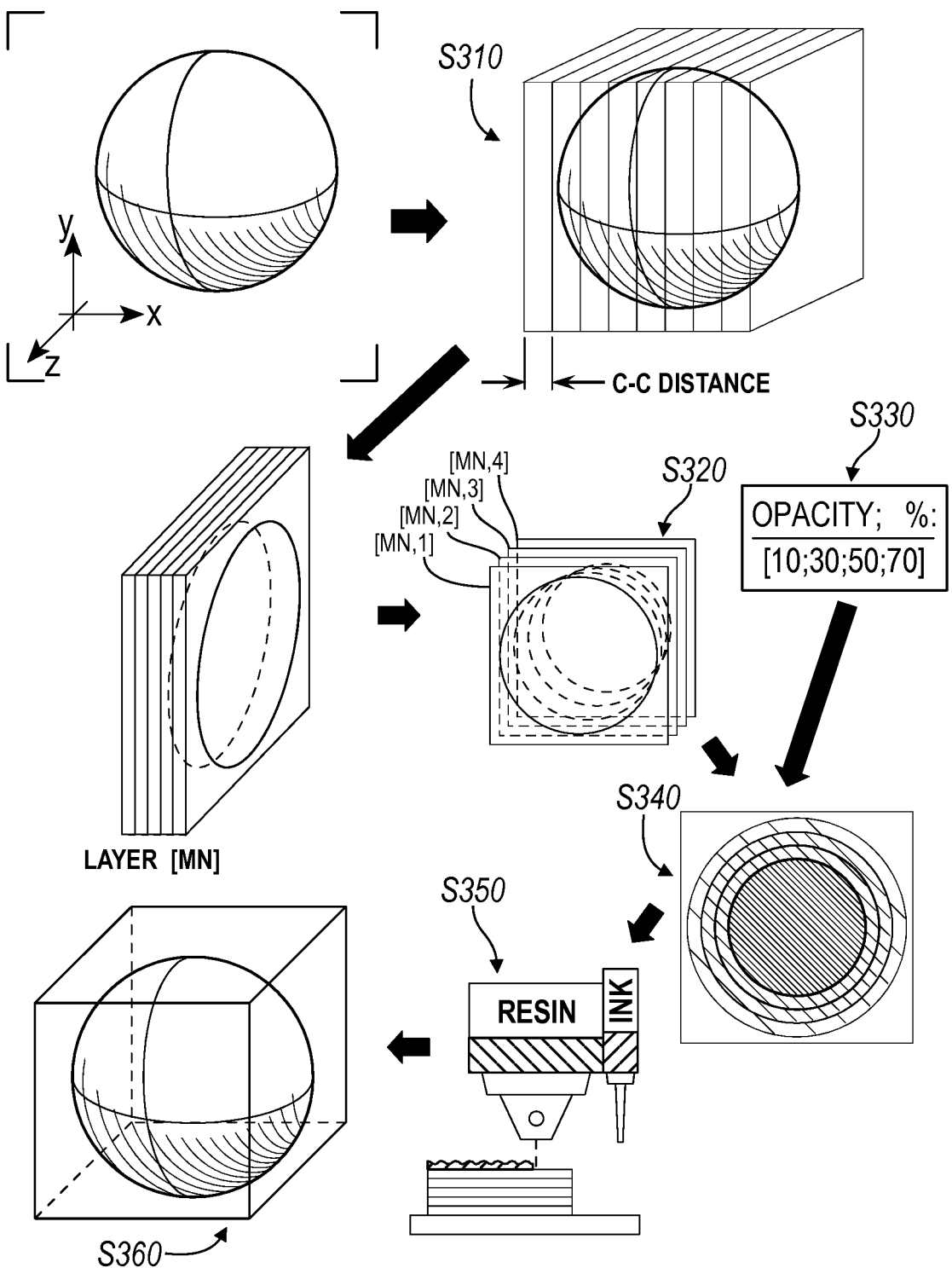
FIG. 3 is a flowchart representation of a third method of the invention.

As shown in FIG. 3, a third method S300 for manufacturing a physical volumetric representation of a virtual three-dimensional object includes: slicing the virtual three-dimensional object into a set of virtual layers of discrete virtual thickness based on a selected resolution for the physical volumetric representation in Block S310; for each virtual layer in the set of virtual layers, selecting a set of adjacent cross-sections of a portion of the virtual three-dimensional object contained within the virtual layer in Block S320; for each virtual layer in the set of virtual layers, setting an opacity level for each cross-section in the set of cross-sections in Block S330; for each virtual layer in the set of virtual layers, combining the set of cross-sections into a composite cross-section based on an opacity level set for each cross-section in the set of cross-sections in Block S340; for each virtual layer in the set of virtual layers, printing the composite cross-section onto a transparent portion of a dominant face of a substrate in a set of substrates in Block S350; and arranging the set of substrates into a stack, each substrate in the set of substrates positioned within the stack according to a position within the virtual three-dimensional object of a cross-section printed on the substrate in Block S360.

Generally, the third method S300 functions to combine multiple adjacent cross-sections of the virtual model into a single two-dimensional image that can be printed onto one dominant face of a substrate (or polymer layer) within a set of substrates assembled or printed into a stack as in the first method S100 and the second method S200 described above. In particular, the third method S300 can generate composite cross-sections of a virtual model that yield reduced contour effects when printed onto substrates of discrete thickness and arranged in a stack as described above. For example, Block S110 of the first method S100 or Block S210 of the second method S200 can execute the third method S300 to slice a virtual three-dimension model of an object into adjacent virtual layers of constant discrete virtual thickness corresponding to a target center-to-center distance between substrates in a corresponding real model, select a number of cross-sections offset by some virtual distance in each virtual layer, set an opacity for each cross-section in each virtual layer, and combine cross-sections in each virtual layer into a composite cross-section corresponding to each virtual layer in the virtual model. The subsequent Blocks of the first method S100 or the second method S200 can then print images of the composite cross-sections onto substrates (i.e., polymer layers) to create a stack depicting a three-dimensional representation of the image. In this example, the stack can include 101 substrates defining 100 planar interstices between adjacent substrates on which images of the virtual model are printed. However, the third method S300 can capture 10,000 cross-sections equally spaced through the virtual model and combine sets of 100 adjacent cross-sections into single composite cross-sections, and images of the cross-sections can then be printed on dominant faces of the substrates such that the complete stack depicts 100 images of composite cross-sections representing 10,000 cross-sections of the virtual object, thereby reducing perceived steps between layers in the stack and increasing perceived resolution of the real model over a real model with 100 images representing only 100 cross-sections of the virtual model.

The third method S300 can therefore be executed on a computer device, such as within a three-dimensional printing application or software, a CAD program, etc. on a desktop or laptop computer. Alternatively, the third method S300 can be executed by a 3D printer implemented the first method S100 and/or the second method S200 described above. However, the third method S300 can be implemented on any other device and in any other way.

3.1 Virtual Layers

Block S310 of the third method S300 recites slicing the virtual three-dimensional object into a set of virtual layers of discrete virtual thickness based on a selected resolution for the physical volumetric representation. Generally, Block S310 functions to define a set of virtual (planar) layers of defined virtual thickness within the virtual model.

Figure 6:
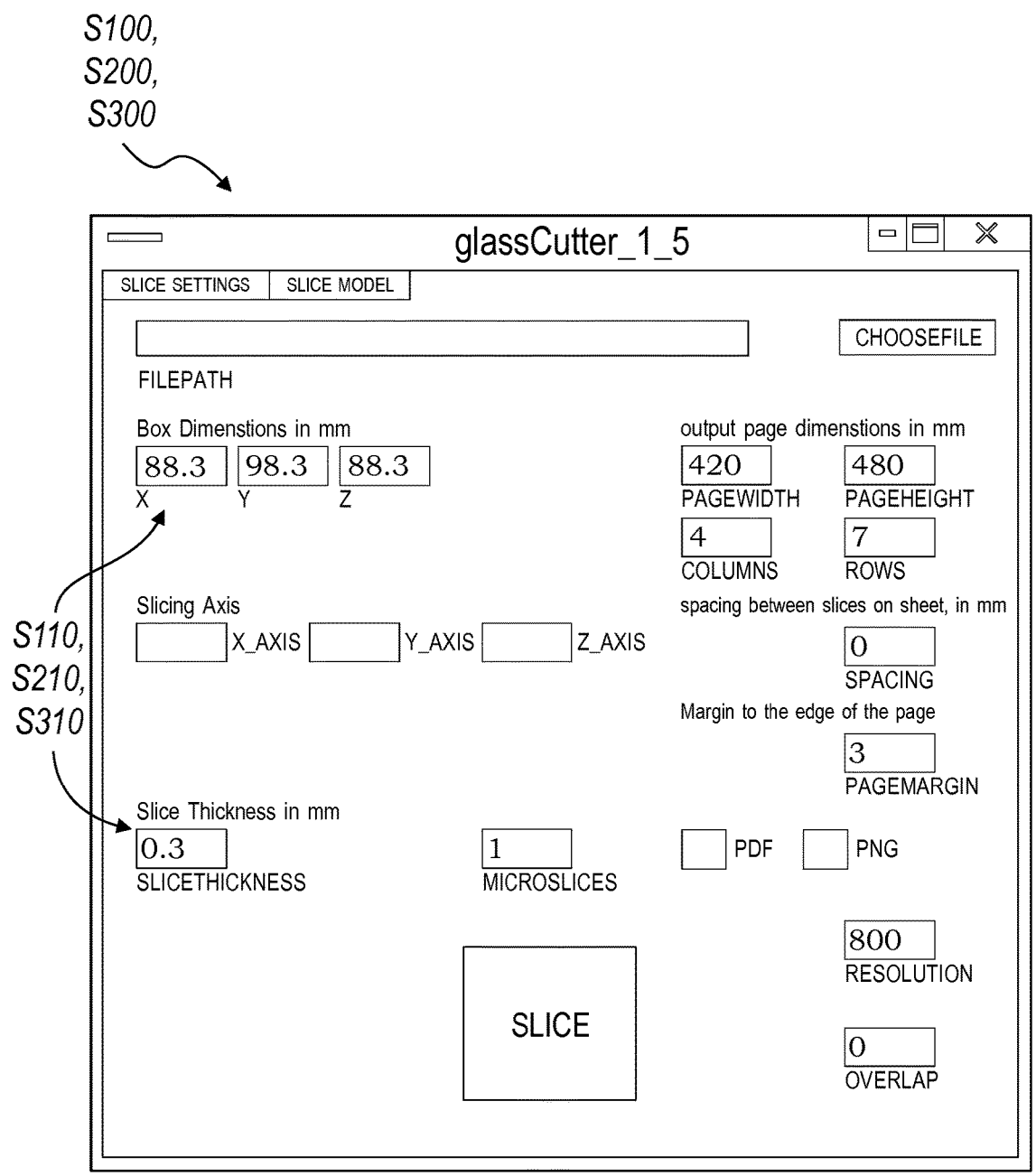
FIG. 6 is a graphical representation of one variation of the methods.

In one implementation, Block S310 receives a selection for a scale of the real model, such as a scale relative to the virtual model, a maximum real dimension of the real model, or a real dimension of a feature of the real model through a user interface, as shown in FIG. 6, and Block S310 then scales the virtual three-dimensional object according to the scale selection. In this implementation Block S310 further receives a resolution selection for the real model, such as a maximum real or perceived distance between substrates in the completed stack, sets a target center-to-center distance between substrates within the real stack based on the resolution selection and the scale selection, and then slices the scaled virtual three-dimensional object into the set of virtual layers of virtual thickness approximating the target center-to-center distance. For example, for a virtual sphere, Block S310 can receive a scale selection for representation of a 100 mm-diameter sphere in the real model, receive a resolution selection of 0.05 mm, select a default substrate thickness of 0.5 mm (e.g., based on available materials or resolution capabilities of the 3D printer), and slice the virtual model of the sphere into 200 layers, each corresponding to a thickness of 0.5 mm in the real mode, based on the scale selection. However, because the resolution requirement is smaller than the target center-to-center distance between adjacent substrates, Block S310 can trigger Block S320 to select at least ten cross-sections per virtual layer such that a cross-section of the virtual model corresponding to at least every 0.05 mm in the real model is recorded in Block S320 in order to satisfy the resolution selection of 0.05 mm. Block S310 can therefore "slice" the virtual model into a set of virtual layers based on a scale (e.g., size) selection of the real model.

Alternatively, Block S310 can slice the virtual three-dimensional object into a preset or default number of virtual layers, each corresponding to a thickness in the real model, and thus select or calculate a per-substrate thickness for the real model accordingly. However, Block S310 can define a virtual layer of discrete virtual thickness within the virtual model in any other suitable way and according to any other suitable schema.

3.2 Micro-Slices

Block S320 of the third method S300 recites, for each virtual layer in the set of virtual layers, selecting a set of adjacent cross-sections of a portion of the virtual three-dimensional object contained within the virtual layer. Generally, Block S320 functions to select a set of discrete two-dimensional cross-sections of the virtual model contained within each virtual layer of the virtual model selected in Block S310. For example, Block S320 can select adjacent and parallel two-dimensional cross-sections of the virtual model set at uniform virtual offset distances throughout the virtual model. In this example, Block S320 can select—for each virtual layer in the set of virtual layers defined in Block S310—a first cross-section, a second cross-section, and a third cross-section within the virtual layer, wherein the second cross-section is interposed between the first cross-section and the third cross-section such that more cross-sections are selected from the virtual model than a number of substrates allocated for the real model.

In the example above in which Block S320 sets a center-to-center distance for adjacent substrates at 0.5 mm and receives a resolution selection of 0.05 mm, Block S320 can select at least ten parallel cross-sections offset by a constant distance from each virtual layer of the virtual model defined in Block S310. For example, Block S320 can select, from each virtual layer, ten cross-sections spaced apart by a virtual distance corresponding to 0.05 mm in real space, including one cross-section at each of a virtual thickness of a virtual layer corresponding to 0.00 mm, 0.05 mm, 0.10 mm, 0.15 mm, 0.20 mm, 0.25 mm, 0.30 mm, 0.35 mm, 0.40 mm, and 0.45 mm in the real model.

Alternatively, Block S320 can select a preset number or at least a minimum number of cross-sections from each adjacent virtual planar rectilinear layer defined in the virtual model. Block S320 can also vary a number of cross-sections selected per virtual layer. For example, Block S320 can qualify a level of detail in the virtual model for each virtual layer and set a number of cross-sections per layer accordingly, such as by setting a higher number of selected cross-sections per virtual layer for a virtual layer exhibiting a higher level of details than for a virtual layer exhibiting a lower level of detail.

However, Block S320 can select any one or more cross-sections of the virtual model from each virtual layer in any other suitable way and according to any other schema.

3.3 Opacity

Block S330 of the third method S300 recites, for each virtual layer in the set of virtual layers, setting an opacity level for each cross-section in the set of cross-sections. Generally, Block S330 functions to define a parameter for combining cross-sections within each virtual layer into composite cross-sections by setting opacity levels (i.e., a degree of translucency) for each cross-section of the virtual model selected in Block S320. In particular, Block S330 can set opacity levels for each cross-section selected from a virtual layer in Block S320 such that, when aggregated into a single composite cross-section, distinct features of each cross-section (e.g., geometry, color, shading, line weight, etc.) in a virtual layer are represented and visible within the composite cross-section at least to some degree, as shown in FIGS. 5A, 5B, 5C, and 5D.

In one implementation in which Block S320 selects a preset or default number of cross-sections from each virtual layer, Block S330 applies a static opacity level schedule to the cross-sections in the virtual layer. For example, Block S320 can select a first cross-section, a second cross-section, and a third cross-section within the virtual layer, wherein the second cross-section is interposed between the first cross-section and the third cross-section, and Block S330 can set a first opacity of the first cross-section at 40%, a second opacity of the second cross-section at 30%, and setting a third opacity of the third cross-section at 60% according to an opacity schedule specifying [0.40, 0.30, and 0.60]. Alternatively, Block S330 can set the opacity levels for all cross-sections in a virtual layer as equivalent, such as by setting opacity levels for each cross-sections in a later to 39%.

Alternatively, Block S330 can implement an algorithm, model, or step function to calculate opacity levels for cross-sections within a virtual layer based on a number of selected cross-sections within the virtual layer. For example, Block S320 can select thirty cross-sections per virtual layer, and Block S330 can set an increasing opacity from 1% to 100% for cross-sections 1 through 10 and a decreasing opacity from 100% to 1% cross-sections 11 through 30 such that opacity control within a virtual layer scales with the virtual width of a virtual "slice" (i.e., a virtual layer) of the virtual model, thereby reducing a contour effect within the real model without artificially increasing contrast in certain regions of the volumetric image within the real model. However, Block S330 can set opacity (i.e., transparency) levels of cross-sections of the virtual model in nay other way and according to any other schema.

3.4 Composite Cross-Sections

Block S340 of the third method S300 recites, for each virtual layer in the set of virtual layers, combining the set of cross-sections into a composite cross-section based on an opacity level set for each cross-section in the set of cross-sections. Generally, Block S340 functions to aggregate the cross-sections of each virtual layer into a single composite cross-section corresponding to each virtual layer according to opacity levels set of the cross-sections in each virtual layer.

In one implementation, Block 340 adjusts opacity levels for each cross-section in a virtual layer and then virtually overlays the cross-sections (in the virtual layer) over each other and in order to virtually (i.e., digitally) create the composite cross-section. Thus, in areas of adjacent cross-sections that are the same color, texture, cross hatch, etc., the corresponding area of the composite cross-section may appear darker and/or sharper than for an area of the composite cross-section corresponding to an area of color, texture, cross hatch, etc. of a cross-section that is unique to the set of cross-sections within the virtual layer. Block S350 can then implement any of the techniques or methods described above to print an image of a composite cross-section onto a dominant face of a corresponding substrate of the stack.

In another implementation, Block S340 groups cross-sections of a virtual layer into subsets and aggregates cross-sections in subsets into composite cross-sections. For example, Block S320 can select thirty cross-sections within a virtual layer, and Block S340 can combine—as in the foregoing implementation—cross-sections 1 through 15 into a first composite cross-section according to opacity levels assigned to cross-sections 1 through 15 in Block S330, and Block S340 can combine cross-sections 16 through 30 into a second composite cross-section according to opacity levels assigned to cross-sections 16 through 30 in Block S330. Block S350 can then implement any of the foregoing methods or techniques to print an image of the first composite cross-section onto a dominant face of a corresponding substrate and to then print an image of the second composite cross-section over the first composite cross-section on the same dominant face of the substrate. Alternatively, Block S350 can implement the foregoing methods or techniques to print an image of the first composite cross-section onto a first dominant face of a corresponding substrate and to then print a mirrored image of the second composite cross-section over a second dominant face of the substrate opposite the first dominant face.

However, in another implementation, Block S350 prints images of all (or a subset) of single cross-sections in a virtual layer—one top of the preceding and in order—onto one dominant face of a corresponding substrate. Block S350 can thus print multiple images of composite or single cross-sections of a virtual layer onto one or more dominant faces of a corresponding substrate.

3.5 Blurring

In one variation, Block S340 blurs or "feathers" a periphery or (or enclosed area within) a singular cross-section or a composite cross-section to generate an adjusted cross-section that, when printed onto a substrate in an assembled stack, yields reduced contour effects around a represented surface of the virtual model within the stack. Block S350 can then print a single (i.e., not composite) cross-section of the virtual model within blurred periphery onto each substrate in the set of substrates in the stack, or Block S350 can then print a composite cross-section of the virtual model within blurred periphery onto each substrate in the set of substrates in the stack. However, Block S340 can function in any other way to blur or feather a portion of singular cross-section or a composite cross-section to reduce a perceived contour effect (e.g., perceived topographical-like contour lines) within the real model.

3.6 Printing Cross-Sections and Assembly

Block S350 of the third method S300 recites, for each virtual layer in the set of virtual layers, printing the composite cross-section onto a transparent portion of a dominant face of a substrate in a set of substrates, and Block S360 of the third method S300 recites assembling the set of substrates into a stack, each substrate in the set of substrates positioned within the stack according to a position within the virtual three-dimensional object of a cross-section printed on the substrate. Generally, Blocks S350 and S360 can implement any of the methods or techniques of the first method S100 or the second method S200 to print images of (singular or) composite cross-sections of each virtual layer in the virtual model onto dominant faces of corresponding substrates and to complete the real model. For example, as in the second method S200 described above, Block S350 and Block S360 can include printing a new layer of transparent polymer onto a previous layer of transparent polymer, curing a portion of the new layer of transparent polymer into a substrate, and, with ink, printing a composite cross-section onto an exposed dominant face of the new layer of transparent polymer for each virtual layer in the set of virtual layers.

As described above, Block S350 can also print on both dominant faces of a substrate, such as to improve resolution of the real model without increasing a number of substrates in the stack. However, Block S350 and Block S360 can implement any other methods or techniques to print images of cross-sections of the virtual model onto substrates in the sack and to complete the real model.

4. Fourth Method: White Layer

A fourth method for manufacturing a physical volumetric representation of a virtual three-dimensional object includes: selecting a series of cross-sections of the virtual three-dimensional object; for each cross-section in the series of cross-sections, extracting a virtual color layer from the cross-section; for each cross-section in the series of cross-sections, setting an opacity level of the virtual color layer of the cross-section; for each cross-section in the series of cross-sections, extracting a virtual white layer from the cross-section; for each cross-section in the series of cross-sections, setting an opacity level of the virtual white layer of the cross-section; for each cross-section in the series of cross-sections, applying a discrete image of the virtual color layer of the cross-section onto a transparent portion of a corresponding substrate in a set of substrates according to the opacity level of the virtual color layer of the cross-section; and applying a discrete image of the virtual white layer of the cross-section onto the transparent portion of the corresponding substrate according to the opacity level of the virtual white layer of the cross-section; and arranging the set of substrates into a stack.

Generally, the fourth method can be implemented in conjunction with any other the foregoing methods to generate virtual layers of cross-sections of a virtual model that, when printed onto transparent substrates as described above, provide advanced brightness and opacity control for a physical representation of the virtual model contained within a stack of the transparent substrates. In particular, the fourth method generates discrete one or more virtual color (e.g., CMYK) images and a discrete virtual white image of a cross-section of the virtual model (or a composite cross-section of a virtual layer of the virtual model), and the color and white images for a cross-section of the virtual model can be printed separately and adjacent—at corresponding opacity levels—onto a corresponding substrate within the stack of substrates to form the real model.

4.1 Cross-Sections

The fourth method includes selecting a series of cross-sections of the virtual three-dimensional object. Generally, the fourth method can implement methods or techniques of Block Silo of the first method S100, Block S210 of the second method S200, and/or the third method S300 to select multiple cross-sections of the virtual model.

In one example, a computing device executes to slice the virtual three-dimensional object into a set of virtual layers of discrete virtual thickness based on a selected resolution for the physical volumetric representation and to select a set of adjacent secondary cross-sections of a portion of the virtual three-dimensional object contained within the virtual layer for each virtual layer in the set of virtual layers. The computing device can then set an opacity level for each secondary cross-section in the series of secondary cross-sections and combine the series of secondary cross-sections into a composite cross-section based on an opacity level set for each secondary cross-section in the series of secondary cross-sections for each virtual layer in the set of virtual layers. The fourth method can thus be implemented to generate a series of composite cross-sections, such as described above.

In another implementation, the fourth method selects discrete cross-sections at a constant offset through the virtual model, as described above. However, the fourth method can function in any other way to select a series of discrete or composite cross-sections of the virtual model and to pass these cross-sections onward.

4.2 White and Color Layers

The fourth method recites, for each cross-section in the series of cross-sections, extracting a virtual color layer from the cross-section, and, for each cross-section in the series of cross-sections, extracting a virtual white layer from the cross-section. Generally, steps of the fourth method cooperate to extract and/or separate and/or generate a color component and a white component of each (discrete or composite) cross-section previously selected.

In one implementation, for each cross-section of the virtual model, the fourth method converts the cross-section to a grayscale image, inverts colors of the grayscale image to generate an inverted grayscale image, maps each pixel in the inverted image into the virtual white image according to an intensity value of each pixel (or cluster of pixels) in the inverted grayscale image. The fourth method can thus generate a white layer—for a particular cross-section—that exhibits varying intensities of white across a virtual two-dimensional plane represented by the white layer, the fourth method can set a global opacity adjustment across the whole white layer, and the fourth method can print the white layer onto a corresponding substrate according to the global opacity level by printing dots of white ink at varying densities (e.g., varying dots per inch) or in varying intensities (e.g., volumes of ink per dot), etc. to replicate the varying intensities of white pixels defined across the white layer.

In the foregoing implementation, the fourth method can thus convert each cross-section in the set of (discrete or composite) cross-sections into a cyan, magenta, yellow, and black pixel color map. However, the fourth method can extract color and white layers.

In one variation, the fourth method generates three composite cross-sections per virtual layer of the virtual model, as in the third method S300 described above. In particular, for each virtual layer of the virtual model, the fourth method can generate a first composite cross-section from (secondary) cross-sections within a first half of a thickness of a virtual layer, generate a second composite cross-section from (secondary) cross-sections within a second half of the thickness of the virtual layer, and generate a third composite cross-section from (secondary) cross-sections from both the first and second halves of the virtual layer. The fourth method can then extract a first virtual color layer from the first composite cross-section and a second virtual color layer from the second composite cross-section, and the fourth method can extra a virtual white layer from the third composite cross-section for each virtual layer of the virtual model. In this variation, the fourth method can print an image of the first virtual color layer onto a corresponding substrate, the fourth method can print an image of the virtual white layer over the image of the first virtual color layer, and the fourth method can print an image of the second virtual color layer over the image of the white layer for each virtual layer in the virtual model.

4.3 Opacity

The fourth method recites, for each cross-section in the series of cross-sections, setting an opacity level of the virtual color layer of the cross-section, and, for each cross-section in the series of cross-sections, setting an opacity level of the virtual white layer of the cross-section. Generally, the fourth method functions to set opacity levels for the virtual color layer and the virtual white layer, respectively, such as by implementing methods or techniques of Block S330 described above.

4.4 Printing

The fourth method recites, for each cross-section in the series of cross-sections, applying a discrete image of the virtual color layer of the cross-section onto a transparent portion of a corresponding substrate in a set of substrates according to the opacity level of the virtual color layer of the cross-section, for each cross-section in the series of cross-sections, applying a discrete image of the virtual white layer of the cross-section onto the transparent portion of the corresponding substrate according to the opacity level of the virtual white layer of the cross-section, and, arranging the set of substrates into a stack. Generally, the steps of the fourth method function to implement methods or techniques of the first method S100 and/or the second method S200 described above to apply colored ink (e.g., cyan ink, magenta ink, yellow ink, and black ink) and white ink in the form of an image of a virtual color layer(s) and in the form of an image of a virtual white layer, respectively, onto a corresponding substrates and to arrange (e.g., assemble, print) the substrates into a stack. However, the fourth method can function in any other way generate the real model from white ink, colored ink, and a transparent polymer material.

4.5 Digital Display

The methods and techniques of the fourth method (and other methods described above) can similarly be implemented to generate a transient representation of a virtual model within a digital three-dimensional display, such as a stack of transparent digital displays, wherein each discrete digital displays in the three-dimensional display renders an image of a corresponding cross-section of the virtual model. For example, the three dimensional display can implement any of the foregoing methods or techniques to generate virtual color and/or white layer of each three-dimension virtual frame of a digital three-dimensional film, and the stack of transparent displays can render correspond images of the color and/or white layers at a present refresh rate (e.g., twenty frames per second).

The systems and methods of the preferred embodiment can be embodied and/or implemented at least in part as a machine configured to receive a computer-readable medium storing computer-readable instructions. The instructions are preferably executed by computer-executable components preferably integrated with the application, applet, host, server, network, website, communication service, communication interface, hardware/firmware/software elements of a user computer or mobile device, wristband, smartphone, or any suitable combination thereof. Other systems and methods of the preferred embodiment can be embodied and/or implemented at least in part as a machine configured to receive a computer-readable medium storing computer-readable instructions. The instructions are preferably executed by computer-executable components preferably integrated by computer-executable components preferably integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component is preferably a processor but any suitable dedicated hardware device can (alternatively or additionally) execute the instructions.

As a person skilled in the art will recognize from the previous detailed description and from the figures and claims, modifications and changes can be made to the preferred embodiments of the invention without departing from the scope of this invention as defined in the following claims.

We claim:

1. A method for manufacturing a physical volumetric representation of a virtual three-dimensional object, the method comprising:
slicing the virtual three-dimensional object into a set of virtual layers of discrete virtual thickness based on a selected resolution for the physical volumetric representation;
for each virtual layer in the set of virtual layers,
selecting a set of adjacent cross-sections of a portion of the virtual three-dimensional object contained within the virtual layer,
setting an opacity level for each cross-section in the set of cross-sections,
combining the set of cross-sections into a composite cross-section based on an opacity level set for each cross-section in the set of cross-sections, and
printing the composite cross-section onto a transparent portion of a dominant face of a substrate in a set of substrates; and
arranging the set of substrates into a stack, each substrate in the set of substrates positioned within the stack according to a position within the virtual three-dimensional object of a cross-section printed on the substrate.

2. The method of claim 1, wherein slicing the virtual three-dimensional object into the set of virtual layers comprises scaling the virtual three-dimensional object according to a scale selection, receiving the resolution selection, setting a target center-to-center distance between substrates within the stack based on the resolution selection, and slicing the virtual three-dimensional object into the set of virtual layers of virtual thickness approximating the target center-to-center distance.

3. The method of claim 1, wherein printing the composite cross-section onto a substrate in the set of substrates for each virtual layer in the set of virtual layers comprises, for each virtual layer in the set of virtual layers, printing a new layer of transparent polymer onto a previous layer of transparent polymer, curing a portion of the new layer of transparent polymer into a substrate in the set of substrates, and with ink, printing a composite cross-section onto an exposed dominant face of the new layer of transparent polymer.

4. The method of claim 1, wherein printing the composite cross-section onto a substrate in the set of substrates comprises depositing a volume of sugar-based syrup over a previous layer of sugar-based syrup, evaporating moisture from the volume of sugar-based syrup to form a translucent sheet of cast sugar, and printing food-safe ink in the form of an image of a cross-section onto the translucent sheet of cast sugar.

5. The method of claim 1, wherein slicing the virtual three-dimensional object into the set of virtual layers comprises slicing the virtual three-dimensional object into a set of adjacent virtual planar rectilinear layers of discrete thickness, and wherein selecting the set of adjacent cross-sections for each virtual layer in the set of virtual layers comprises selecting a preset number of planar, parallel cross-sections of constant virtual offset distance between cross-sections through a portion of a virtual thickness of a virtual layer in the set of virtual layers.

6. The method of claim 1, wherein selecting the set of adjacent cross-sections for each virtual layer in the set of virtual layers comprises, for each virtual layer in the set of virtual layers, selecting a first cross-section, a second cross-section, and a third cross-section within the virtual layer, the second cross-section interposed between the first cross-section and the third cross-section, and wherein setting the opacity level for each cross-section in the set of cross-sections for each virtual layer in the set of virtual layers comprises setting a first opacity of the first cross-section, setting a second opacity of the second cross-section less than the first opacity, and setting a third opacity of the third cross-section greater than the first opacity.

7. The method of claim 1, for each virtual layer in the set of virtual layers,
wherein slicing the virtual three-dimensional object into the set of virtual layers comprises slicing each virtual layer in the set of virtual layers into a first virtual sublayer and a second virtual sublayer,
wherein selecting the set of adjacent cross-sections for each virtual layer in the set of virtual layers comprises selecting a first set of adjacent cross-sections within the first virtual sublayer and selecting a second set of adjacent cross-sections within the second virtual sublayer of each virtual layer in the set of virtual layers,
wherein combining the set of cross-sections into a composite cross-section for each virtual layer in the set of virtual layers comprises combining the first set of cross-sections into a first composite cross-section and combining the second set of cross-sections into a second composite cross-section, and
wherein printing the composite cross-section onto the substrate in a set of substrates for each virtual layer in the set of virtual layers comprising printing the first composite cross-section onto a first dominant face of the substrate and printing the second composite cross-section onto a second dominant face of the substrate opposite the first dominant face for each virtual layer in the set of virtual layers.

8. The method of claim 1, wherein setting the opacity level for a cross-section in the set of cross-sections comprises extracting a virtual white layer from the set of cross-sections and setting an opacity level for the virtual white layer, and wherein printing the composite cross-section onto a substrate in the set of substrates comprises printing an image of the composite cross-section onto the dominant face of the substrate and printing an image of the virtual white layer over the image of the composite cross-section.

9. The method of claim 8 wherein combining the set of cross-sections into the composite cross-section for each virtual layer in the set of virtual layers comprises aggregating a first subset of adjacent cross-sections in the set of cross-sections into a first composite cross-section and aggregating a second subset of adjacent cross-sections in the set of cross-sections distinct from the first subset of adjacent cross-sections into a second composite cross-section, and wherein printing the composite cross-section onto a substrate in the set of substrates comprises printing an image of the first composite cross-section onto the dominant face of the substrate, printing the image of the virtual white layer over the image of the first composite cross-section, and printing the image of the second composite cross-section over the image of the virtual white layer.

10. The method of claim 1, wherein arranging the set of substrates into the stack comprises:
depositing a first layer of transparent polymer over a build platform,
curing a portion of the first layer of transparent polymer,
with ink, printing an image of a first composite cross-section onto a cured exposed dominant face of the first layer,
depositing a second layer of transparent polymer over the first layer of transparent polymer, curing a portion of the second layer of transparent polymer, and with ink, printing an image of a second composite cross-section onto a cured exposed dominant face of the second layer according to an order of the set of cross-sections.

11. The method of claim 1, wherein arranging the set of substrates into the stack comprises:

for each virtual layer in the set of virtual layers, printing a composite cross-section over a transparent portion of a dominant face of one substrate in a set of substrates, assembling the set of substrates into a stack, each substrate in the set of substrates positioned within the stack according to a position within the virtual three-dimensional object of a cross-section printed on the substrate, drawing a vacuum around the stack, in the presence of the vacuum, introducing a transparent fluid to interstices between substrates in the stack, an index of refraction of the transparent fluid approximating an index of refraction of a substrate in the set of substrates, and releasing the vacuum around the stack.

12. A method for manufacturing a physical volumetric representation of a virtual three-dimensional object, the method comprising:

selecting a set of cross-sections of the virtual three-dimensional object; wherein selecting the set of cross-sections comprises slicing the virtual three-dimensional object into a set of virtual layers of discrete virtual thickness based on a selected resolution for the physical volumetric representation, and, for each virtual layer in the set of virtual layers, selecting a set of adjacent secondary cross-sections of a portion of the virtual three-dimensional object contained within the virtual layer, setting an opacity level for each secondary cross-section in the set of secondary cross-sections, combining the set of secondary cross-sections into a composite cross-section based on an opacity level set for each secondary cross-section in the series set of secondary cross-sections, wherein extracting a virtual color layer from a cross-section and extracting a virtual white layer from the cross-section for each cross-section in the set of cross-sections comprises extracting the virtual color layer from a composite cross-section and extracting the virtual white layer from the composite cross-section for each composite cross-section in the set of cross-sections, and for each cross-section in the set of cross-sections:
extracting a virtual color layer from the cross-section;
setting an opacity level of the virtual color layer of the cross-section;
extracting a virtual white layer from the cross-section;
setting an opacity level of the virtual white layer of the cross-section;
applying a discrete image of the virtual color layer of the cross-section onto a transparent portion of a corresponding substrate in a set of substrates according to the opacity level of the virtual color layer of the cross-section; and
applying a discrete image of the virtual white layer of the cross-section onto the transparent portion of the corresponding substrate according to the opacity level of the virtual white layer of the cross-section; and arranging the set of substrates into a stack.

13. The method of claim 12, wherein, for each cross-section in the set of cross-sections, applying a discrete image of a virtual color layer of the cross-section onto a corresponding substrate comprises printing a combination of cyan ink, magenta ink, yellow ink, and black ink in the form of the image of the virtual color layer onto a dominant face of the corresponding substrate, and wherein applying a discrete image of a virtual white layer of the cross-section onto the corresponding substrate comprises printing a white ink in the form of the image of the virtual white layer over the image of the virtual color layer.

14. The method of claim 13, wherein, for each cross-section in the set of cross-sections, applying a discrete image of a virtual color layer of the cross-section onto a corresponding substrate comprises printing food-safe ink in the form of the image of the virtual color layer onto a dominant face of a translucent sheet of cast sugar comprising the corresponding substrate.

15. The method of claim 12, wherein combining the set of secondary cross-sections into the composite cross-section for each virtual layer in the set of virtual layers comprises aggregating a first subset of adjacent secondary cross-sections in the set of secondary cross-sections into a first composite cross-section and aggregating a second subset of adjacent secondary cross-sections in the set of secondary cross-sections distinct from the first subset of adjacent secondary cross-sections into a second composite cross-section, and wherein applying the composite cross-section onto a corresponding substrate in the set of substrates comprises printing an image of the first composite cross-section onto a dominant face of the corresponding substrate, printing an image of the virtual white layer over the image of the first composite cross-section, and printing an image of the second composite cross-section over the image of the virtual white layer.

16. The method of claim 12, wherein, for each cross-section in the set of cross-sections, extracting a virtual white layer from the cross-section comprises converting the cross-section to a grayscale image, inverting colors of the grayscale image to generate an inverted grayscale image, and mapping each pixel in the inverted image into the virtual white image according to an intensity value of each pixel in the inverted grayscale image.

17. The method of claim 16, wherein, for each cross-section in the set of cross-sections, extracting a virtual color layer from the cross-section comprises converting the cross-section into a cyan, magenta, yellow, and black pixel color map.

18. The method of claim 12, wherein arranging the set of substrates into the stack comprises:

depositing a first layer of transparent polymer over a build platform, curing a portion of the first layer of transparent polymer, with ink, printing an image of a first composite cross-section onto a cured exposed dominant face of the first layer, depositing a second layer of transparent polymer over the first layer of transparent polymer, curing a portion of the second layer of transparent polymer, and with ink, printing an image of a second composite cross-section onto a cured exposed dominant face of the second layer according to an order of the set of cross-sections.

19. The method of claim 12, wherein arranging the set of substrates into the stack comprises:

for each virtual layer in the set of virtual layers, printing a composite cross-section over a transparent portion of a dominant face of one substrate in a set of substrates, assembling the set of substrates into a stack, each substrate in the set of substrates positioned within the stack according to a position within the virtual three-dimensional object of a cross-section printed on the substrate, drawing a vacuum around the stack, in the presence of the vacuum, introducing a transparent fluid to interstices between substrates in the stack, an index of refraction of the transparent fluid approximating an index of refraction of a substrate in the set of substrates, and releasing the vacuum around the stack.

* * * * *